(12) United States Patent
Ren et al.

(10) Patent No.: US 12,700,906 B2
(45) Date of Patent: *Aug. 4, 2026

(54) CHANNEL INFORMATION FEEDBACK METHOD AND COMMUNICATION APPARATUS

(71) Applicant: HUAWEI TECHNOLOGIES CO., LTD., Shenzhen (CN)

(72) Inventors: Xiang Ren, Boulogne Billancourt (FR); Huangping Jin, Shanghai (CN); Xiaohan Wang, Shanghai (CN); Shibin Ge, Shanghai (CN); Yiling Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 19/009,263

(22) Filed: Jan. 3, 2025

(65) Prior Publication Data

US 2025/0226870 A1    Jul. 10, 2025

Related U.S. Application Data

(63) Continuation of application No. 17/852,957, filed on Jun. 29, 2022, now Pat. No. 12,244,381, which is a
(Continued)

(51) Int. Cl.
*H04B 7/06* (2006.01)

(52) U.S. Cl.
CPC ........... *H04B 7/0626* (2013.01); *H04B 7/063* (2013.01)

(58) Field of Classification Search
CPC .... H04B 7/0626; H04B 7/063; H04B 7/0632; H04B 7/0639; H04B 7/0645; H04B 17/30;
(Continued)

(56) References Cited

U.S. PATENT DOCUMENTS 9,020,051 B2 * 4/2015 Lee ........................ H04L 5/0091
                                                                375/267
9,668,253 B2 * 5/2017 Lee ........................ H04L 5/0091
(Continued)

FOREIGN PATENT DOCUMENTS

CN        101043290 A      9/2007
CN        102823168 A      12/2012
(Continued)

OTHER PUBLICATIONS

3rd Generation Partnership Project;Technical Specification Group Radio Access Network;NR;Physical layer procedures for data(Release 15) 3GPP TS 38.214 V15.7.0 (Sep. 2019) total 13pages.

*Primary Examiner* — James M Perez
(74) *Attorney, Agent, or Firm* — WOMBLE BOND DICKINSON (US) LLP

(57)    ABSTRACT

This application describes a channel information feedback method and a communication apparatus. The method includes a terminal device that receives configuration information sent by a network device, where the configuration information is used to configure a feedback mode of channel information. The terminal device may feed back current channel information to the network device when the feedback mode configured by using the configuration information is a first mode. The terminal device may alternatively feeds back predicted channel information to the network device when the feedback mode configured by using the configuration information is a second mode. System performance is therefore improved by the method described in this application because channel information feedback requirements in different scenarios can be met. In particular, a problem that data transmission performance deteriorates because channel information expires in a moving scenario
(Continued)

Obtain [PMI (6N), PMI (8N), PMI (10N)] through prediction

H(N)  H(2N)  H(3N)  H(4N)

Measurement

Time (t)

Slot   Slot   Slot   Slot
(N)    (2N)   (3N)   (4N)

Feed back [PMI (6N), PMI (8N), PMI (10N)]

Feedback

Time (t)

Slot
(5N)   PMI    PMI    PMI    PMI  PMI
       (6N)   (6N)   (8N)   (8N) (10N)

Transmission

Slot   Slot   Slot  Slot  Slot  Time (t)
(6N)   (7N)   (8N)  (9N)  (10N)

can be resolved by feeding back the predicted channel information.

12 Claims, 11 Drawing Sheets

Related U.S. Application Data continuation of application No. PCT/CN2019/130991, filed on Dec. 31, 2019.

(58) Field of Classification Search
CPC . H04B 17/373; H04B 17/391; H04B 17/3913
See application file for complete search history.

(56) References Cited

U.S. PATENT DOCUMENTS

| | | | | |
|---|---|---|---|---|
| 9,973,309 | B2* | 5/2018 | Lee | H04J 11/00 |
| 9,998,249 | B2* | 6/2018 | Thiele | H04B 7/0417 |
| 10,014,916 | B2* | 7/2018 | Yuan | H04B 17/373 |
| 10,305,866 | B2* | 5/2019 | Song | H04L 63/0428 |
| 10,367,677 | B2* | 7/2019 | Parkvall | H04W 52/0251 |
| 10,560,162 | B2* | 2/2020 | Liu | H04B 7/0486 |
| 10,742,296 | B2* | 8/2020 | He | H04L 5/003 |
| 10,911,122 | B2* | 2/2021 | Wu | H04L 5/0048 |
| 11,128,359 | B2* | 9/2021 | Zhou | H04L 5/0048 |
| 11,129,192 | B2* | 9/2021 | Kela | H04W 72/1263 |
| 11,146,317 | B2* | 10/2021 | Jin | H04B 7/0634 |
| 11,211,980 | B2* | 12/2021 | Wu | H04B 17/309 |
| 11,290,164 | B2* | 3/2022 | Zhang | H04B 7/0626 |
| 11,349,541 | B2* | 5/2022 | Li | H04W 24/10 |
| 11,405,930 | B2* | 8/2022 | Tong | H04W 72/542 |
| 11,456,786 | B2* | 9/2022 | Wang | H04B 7/0478 |
| 11,483,042 | B2* | 10/2022 | Xue | H04L 1/1861 |
| 11,553,521 | B2* | 1/2023 | Li | H04W 72/23 |
| 11,569,961 | B2* | 1/2023 | Farmanbar | H04B 7/0417 |
| 11,595,089 | B2* | 2/2023 | Ramireddy | H04B 7/06956 |
| 11,616,551 | B2* | 3/2023 | Großmann | H04B 7/0478 |
| | | | | 370/329 |
| 11,683,076 | B2* | 6/2023 | Wu | H04B 7/0456 |
| | | | | 375/267 |
| 11,736,170 | B2* | 8/2023 | Li | H04L 5/0064 |
| | | | | 370/329 |
| 11,804,884 | B2* | 10/2023 | Xu | H04L 5/0048 |
| 11,832,251 | B2* | 11/2023 | Hajri | H04L 1/0026 |
| 11,848,729 | B2* | 12/2023 | Wang | H04L 5/0003 |
| 11,870,525 | B2* | 1/2024 | Hang | H04L 5/0051 |
| 12,047,148 | B2* | 7/2024 | Großmann | H04B 7/0478 |
| 12,244,381 | B2* | 3/2025 | Ren | H04B 7/065 |
| 12,284,018 | B2* | 4/2025 | Jin | H04B 7/0663 |
| 12,494,827 | B2* | 12/2025 | Großmann | H04B 7/0478 |
| 12,556,345 | B2* | 2/2026 | Jiao | H04L 5/0051 |
| 2011/0235743 | A1* | 9/2011 | Lee | H04L 5/0053 |
| | | | | 375/295 |
| 2012/0063500 | A1* | 3/2012 | Wang | H04B 7/063 |
| | | | | 375/224 |
| 2012/0093089 | A1* | 4/2012 | Park | H04B 7/0626 |
| | | | | 370/328 |

| | | | | |
|---|---|---|---|---|
| 2013/0064128 | A1* | 3/2013 | Li | H04L 1/0026 |
| | | | | 370/252 |
| 2013/0343215 | A1* | 12/2013 | Li | H04B 7/0417 |
| | | | | 370/252 |
| 2015/0208397 | A1* | 7/2015 | Lee | H04W 72/23 |
| | | | | 370/329 |
| 2016/0088646 | A1* | 3/2016 | Sun | H04L 1/0028 |
| | | | | 370/329 |
| 2016/0135180 | A1* | 5/2016 | Yuan | H01Q 21/22 |
| | | | | 370/329 |
| 2017/0012724 | A1* | 1/2017 | Zirwas | H04B 17/373 |
| 2017/0237533 | A1* | 8/2017 | Lee | H04L 5/0048 |
| | | | | 375/260 |
| 2017/0331670 | A1* | 11/2017 | Parkvall | H04W 52/0229 |
| 2019/0207662 | A1* | 7/2019 | Zhou | H04B 7/0626 |
| 2020/0106491 | A1* | 4/2020 | Wu | H04L 1/16 |
| 2020/0119794 | A1* | 4/2020 | Wu | H04B 7/0456 |
| 2020/0204229 | A1* | 6/2020 | Jin | H04B 7/0469 |
| 2020/0212974 | A1* | 7/2020 | Wu | H04B 7/0469 |
| 2020/0229201 | A1* | 7/2020 | Tong | H04B 7/0617 |
| 2020/0329496 | A1* | 10/2020 | Li | H04W 72/1273 |
| 2021/0067297 | A1* | 3/2021 | Farmanbar | H04L 5/0096 |
| 2021/0143885 | A1* | 5/2021 | Großmann | H04B 7/0478 |
| 2021/0226674 | A1* | 7/2021 | Ramireddy | H04B 7/0478 |
| 2021/0234583 | A1* | 7/2021 | Wang | H04B 7/0478 |
| 2021/0250076 | A1* | 8/2021 | Jin | H04B 7/0626 |
| 2021/0288707 | A1* | 9/2021 | Hang | H04B 7/026 |
| 2021/0376895 | A1* | 12/2021 | Xue | H04B 7/0626 |
| 2022/0021432 | A1* | 1/2022 | Zhou | H04W 24/10 |
| 2022/0029676 | A1* | 1/2022 | Ramireddy | H04B 7/0626 |
| 2022/0329305 | A1* | 10/2022 | Ren | H04B 7/065 |
| 2022/0386292 | A1* | 12/2022 | Hajri | H04L 5/0057 |
| 2022/0416858 | A1* | 12/2022 | Wang | H04B 7/0626 |
| 2022/0417779 | A1* | 12/2022 | Madadi | H04L 5/0057 |
| 2023/0109947 | A1* | 4/2023 | Parkvall | H04J 11/0079 |
| | | | | 455/418 |
| 2023/0122302 | A1* | 4/2023 | Wang | H04B 7/063 |
| | | | | 370/329 |
| 2023/0208494 | A1* | 6/2023 | Großmann | H04B 7/0478 |
| | | | | 370/329 |
| 2023/0239069 | A1* | 7/2023 | Liu | H04L 1/0003 |
| | | | | 370/252 |
| 2023/0421219 | A1* | 12/2023 | Jiang | H04B 7/0417 |
| 2024/0048203 | A1* | 2/2024 | Wang | H04B 7/0632 |
| 2024/0072858 | A1* | 2/2024 | Wang | H04B 7/0626 |
| 2024/0187063 | A1* | 6/2024 | Jeon | H04B 7/0626 |
| 2024/0322885 | A1* | 9/2024 | Gao | H04L 5/0048 |
| 2024/0340062 | A1* | 10/2024 | Großmann | H04B 7/0478 |
| 2025/0226870 | A1* | 7/2025 | Ren | H04L 25/0228 |
| 2025/0309952 | A1* | 10/2025 | Kim | H04B 7/0478 |

FOREIGN PATENT DOCUMENTS

| | | | |
|---|---|---|---|
| CN | 104753636 | A | 7/2015 |
| CN | 107294689 | A | 10/2017 |
| CN | 108880644 | A | 11/2018 |
| CN | 109996340 | A | 7/2019 |
| EP | 3576312 | A1 | 12/2019 |
| WO | 2010151067 | A2 | 12/2010 |
| WO | 2019061260 | A1 | 4/2019 |

* cited by examiner

CHANNEL INFORMATION FEEDBACK METHOD AND COMMUNICATION APPARATUS

CROSS-REFERENCE TO RELATED APPLICATIONS

This application is a continuation of U.S. patent application Ser. No. 17/852,957, filed on Jun. 29, 2022, which is a continuation of International Application No. PCT/CN2019/130991, filed on Dec. 31, 2019. All of the afore-mentioned patent applications are hereby incorporated by reference in their entireties.

TECHNICAL FIELD

This application relates to the field of communication technologies, and in particular, to a channel information feedback method and a communication apparatus.

BACKGROUND

A fifth generation (5G, 5th generation, etc.) communication system imposes higher requirements on a system capacity, spectral efficiency, and the like. In the 5G communication system, a massive multiple-input multiple-output (massive MIMO) technology plays a critical role in system spectral efficiency. When sending data to a terminal device by using the MIMO technology, a network device needs to perform modulation and coding and signal precoding. However, how the network device sends data to the terminal device depends on channel state information (CSI) fed back by the terminal device to the network device. For example, a basic flowchart in which the terminal device feeds back the CSI to the network device may be shown in FIG. 1. Operations of feeding back CSI according to FIG. 1 are as follows:

101: The network device sends configuration information used for channel measurement to the terminal device, where the configuration information includes a measurement resource, a CSI feedback resource, and the like.

102: The network device sends a pilot to the terminal device.

103: The terminal device receives, on the measurement resource, the pilot sent by the network device, and determines the CSI based on the pilot sent by the network device.

104: The terminal device feeds back the CSI to the network device on the CSI feedback resource.

105: The network device calculates a precoder based on the CSI fed back by the terminal device, and sends data to the terminal device by using the precoder.

However, there is a technical problem of low system performance when the network device sends the data to the terminal device by using the precoder determined through the foregoing procedure.

SUMMARY

This application provides a channel information feedback method and a communication apparatus, to help improve system performance.

According to a first aspect, this application provides a channel information feedback method. The method includes: A terminal device receives configuration information sent by a network device, where the configuration information is used to configure a feedback mode of channel information; and the terminal device feeds back current channel information to the network device when the feedback mode configured by using the configuration information is a first mode; or the terminal device feeds back predicted channel information to the network device when the feedback mode configured by using the configuration information is a second mode. Based on the method described in the first aspect, the current channel information and the predicted channel information may be selectively fed back based on the feedback mode, so that channel information feedback requirements in different scenarios can be met. In particular, a problem that data transmission performance deteriorates because channel information expires in a moving scenario can be resolved by feeding back the predicted channel information. This helps improve system performance.

In a possible embodiment, the current channel information is a current precoding matrix indicator (PMI), and the predicted channel information is a predicted channel coefficient. Based on this possible embodiment, feeding back the current PMI can be compatible with an existing channel information feedback solution, and this helps reduce feedback overheads. Because a channel coefficient can more comprehensively represent a channel time domain characteristic, the terminal device feeds back the predicted channel coefficient, so that the network device can obtain a more comprehensive channel time domain characteristic. Therefore, the network device may correct, with reference to a predicted channel coefficient fed back by another device, the predicted channel coefficient fed back by the terminal device, so that the predicted channel coefficient is more accurate. This helps improve the system performance.

In a possible embodiment, the current channel information is a current channel coefficient, and the predicted channel information is a predicted PMI. Alternatively, the current channel information is a current PMI, and the predicted channel information is a predicted PMI. Alternatively, the current channel information is a current channel coefficient, and the predicted channel information is a predicted channel coefficient.

In a possible embodiment, the configuration information includes a first parameter; and when the first parameter meets a first condition, the configuration information is used to configure the first mode; or when the first parameter meets a second condition, the configuration information is used to configure the second mode, and the first condition is different from the second condition. Based on this possible embodiment, the network device can configure the feedback mode for the terminal device.

In a possible embodiment, when the feedback mode configured by using the configuration information is the second mode, a specific embodiment in which the terminal device feeds back the predicted channel information to the network device is as follows: The terminal device determines the predicted channel information based on a time offset T when the feedback mode configured by using the configuration information is the second mode; and the terminal device feeds back the predicted channel information to the network device. Based on this possible embodiment, the terminal device may predict and report the predicted channel information for which the time offset T is compensated, to match a channel during actual transmission. This avoids a problem that data transmission performance deteriorates because channel information easily expires in a moving scenario, and improves the system performance.

In a possible embodiment, when the feedback mode configured by using the configuration information is the second mode, the configuration information is further used to configure the time offset T. Based on this possible embodiment, the network device can configure the time offset T for the terminal device.

In a possible embodiment, when the feedback mode configured by using the configuration information is the second mode, a specific embodiment in which the terminal device feeds back the predicted channel information to the network device is as follows: When the feedback mode configured by using the configuration information is the second mode, the terminal device determines a plurality of pieces of predicted channel information based on one or more of information of a time offset T, window duration, or a time domain feedback granularity, where the window duration is a time interval between moments of the first piece of channel information and the last piece of channel information in the plurality of pieces of predicted channel information, and the time domain feedback granularity is a time interval between moments at which two adjacent pieces of channel information are fed back; and the terminal device feeds back one or more pieces of predicted channel information to the network device. Based on this possible embodiment, the terminal device may feed back the one or more pieces of predicted channel information, so that the network device can use the predicted channel information to perform matching on a time-varying channel within the window duration. This further improves the system performance. The time-varying channel refers to a channel that varies with time.

In a possible embodiment, a specific embodiment in which the terminal device feeds back the one or more pieces of predicted channel information to the network device is as follows: The terminal device feeds back, to the network device, channel information obtained through processing of a codebook, where the codebook is a codebook based on a time domain dimension, and the channel information obtained through processing of the codebook represents the one or more pieces of predicted channel information. Based on this possible embodiment, the channel information obtained through processing of the codebook is essentially information obtained after information compression is performed on one or more pieces of channel information. This helps save transmission resources.

In a possible embodiment, when the feedback mode configured by using the configuration information is the second mode, the configuration information is further used to configure one or more of the time offset T, the window duration, or the time domain feedback granularity.

According to a second aspect, this application provides a channel information feedback method. The method includes: A network device sends configuration information to a terminal device, where the configuration information is used to configure a feedback mode of channel information; and when the feedback mode configured by using the configuration information is a first mode, the feedback mode is used to indicate the terminal device to feed back current channel information; or when the feedback mode configured by using the configuration information is a second mode, the feedback mode is used to indicate the terminal device to feed back predicted channel information.

In a possible embodiment, the network device receives the current channel information fed back by the terminal device when the feedback mode configured by using the configuration information is the first mode; or the network device receives the predicted channel information fed back by the terminal device when the feedback mode configured by using the configuration information is the second mode.

In a possible embodiment, the current channel information is a current precoding matrix indicator PMI, and the predicted channel information is a predicted channel coefficient.

In a possible embodiment, the configuration information includes a first parameter; and when the first parameter meets a first condition, the configuration information is used to configure the first mode; or when the first parameter meets a second condition, the configuration information is used to configure the second mode, and the first condition is different from the second condition.

In a possible embodiment, when the feedback mode configured by using the configuration information is the second mode, the configuration information is further used to configure a time offset T.

In a possible embodiment, when the feedback mode configured by using the configuration information is the second mode, the configuration information is further used to configure one or more of a time offset T, window duration, or a time domain feedback granularity, where the window duration is a time interval between moments at which the first piece of channel information and the last piece of channel information are predicted by the terminal device, and the time domain feedback granularity is a time interval between moments at which two adjacent pieces of channel information are fed back by the terminal device.

In a possible embodiment, a manner of receiving the predicted channel information fed back by the terminal device is specifically: receiving one or more pieces of predicted channel information fed back by the terminal device.

In a possible embodiment, a manner of receiving the one or more pieces of predicted channel information fed back by the terminal device is specifically: receiving channel information, obtained through processing of a codebook, that is fed back by the terminal device, where the codebook is a codebook based on a time domain dimension, and the channel information obtained through processing of the codebook represents the one or more pieces of predicted channel information.

For beneficial effects of the second aspect, refer to beneficial effects of the first aspect. Details are not described herein.

According to a third aspect, this application provides a channel information feedback method. The method includes: A terminal device receives configuration information sent by a network device, where the configuration information is used to configure a first parameter; and the terminal device feeds back current channel information to the network device when the first parameter configured by using the configuration information meets a first condition; or the terminal device feeds back predicted channel information to the network device when the first parameter configured by using the configuration information meets a second condition.

In a possible embodiment, the current channel information is a current precoding matrix indicator PMI, and the predicted channel information is a predicted channel coefficient.

In a possible embodiment, the current channel information is a current channel coefficient, and the predicted channel information is a predicted PMI. Alternatively, the current channel information is a current PMI, and the predicted channel information is a predicted PMI. Alternatively, the current channel information is a current channel coefficient, and the predicted channel information is a predicted channel coefficient.

In a possible embodiment, when the first parameter configured by using the configuration information meets the second condition, a manner of feeding back the predicted channel information to the network device is specifically: when the first parameter configured by using the configuration information meets the second condition, determining the predicted channel information based on a time offset T; and feeding back the predicted channel information to the network device.

In a possible embodiment, when the first parameter configured by using the configuration information meets the second condition, the configuration information is further used to configure the time offset T.

In a possible embodiment, when the first parameter configured by using the configuration information meets the second condition, a manner of feeding back the predicted channel information to the network device is specifically: when the first parameter configured by using the configuration information meets the second condition, determining a plurality of pieces of predicted channel information based on one or more of information of a time offset T, window duration, or a time domain feedback granularity, where the window duration is a time interval between moment at which the first piece of channel information and the last piece of channel information are predicted, and the time domain feedback granularity is a time interval between moments at which two adjacent pieces of channel information are fed back; and feeding back one or more pieces of predicted channel information to the network device.

In a possible embodiment, a manner of feeding back the one or more pieces of predicted channel information to the network device is specifically: feeding back channel information obtained through processing of a codebook to the network device, where the codebook is a codebook based on a time domain dimension, and the channel information obtained through processing of the codebook represents the one or more pieces of predicted channel information.

In a possible embodiment, when the first parameter configured by using the configuration information meets the second condition, the configuration information is further used to configure one or more of the time offset T, the window duration, or the time domain feedback granularity.

For beneficial effects of the third aspect, refer to beneficial effects of the first aspect. Details are not described herein.

According to a fourth aspect, this application provides a channel information feedback method. The method includes: A network device sends configuration information to a terminal device, where the configuration information is used to configure a first parameter; and when the first parameter configured by using the configuration information meets a first condition, the first parameter is used to indicate the terminal device to feed back current channel information; or when the first parameter configured by using the configuration information meets a second condition, the first parameter is used to indicate the terminal device to feed back predicted channel information.

In a possible embodiment, the network device may further perform the following operations: receiving the current channel information fed back by the terminal device when the first parameter configured by using the configuration information meets the first condition; or receiving the predicted channel information fed back by the terminal device when the first parameter configured by using the configuration information meets the first condition.

In a possible embodiment, the current channel information is a current precoding matrix indicator PMI, and the predicted channel information is a predicted channel coefficient.

In a possible embodiment, when the first parameter configured by using the configuration information meets the second condition, the configuration information is further used to configure a time offset T.

In a possible embodiment, when the first parameter configured by using the configuration information meets the second condition, the configuration information is further used to configure one or more of a time offset T, window duration, or a time domain feedback granularity, where the window duration is a time interval between moments at which the first piece of channel information and the last piece of channel information are predicted by the terminal device, and the time domain feedback granularity is a time interval between moments at which two adjacent pieces of channel information are fed back by the terminal device.

In a possible embodiment, a manner of receiving the predicted channel information fed back by the terminal device is specifically: receiving one or more pieces of predicted channel information fed back by the terminal device.

In a possible embodiment, a manner of receiving the one or more pieces of predicted channel information fed back by the terminal device is specifically: receiving channel information, obtained through processing of a codebook, that is fed back by the terminal device, where the codebook is a codebook based on a time domain dimension, and the channel information obtained through processing of the codebook represents the one or more pieces of predicted channel information.

For beneficial effects of the fourth aspect, refer to beneficial effects of the first aspect. Details are not described herein.

According to a fifth aspect, this application provides a channel information feedback method. The method includes: A terminal device determines predicted channel information based on a time offset T; and the terminal device feeds back the predicted channel information to a network device. The method described in the fifth aspect helps improve system performance.

In a possible embodiment, the terminal device may further receive configuration information sent by the network device, where the configuration information is used to configure the time offset T. Based on this possible embodiment, the network device can configure the time offset T for the terminal device.

In a possible embodiment, the predicted channel information is a predicted PMI or a predicted channel coefficient.

According to a sixth aspect, this application provides a channel information feedback method. The method includes: A network device receives predicted channel information fed back by a terminal device. The method described in the sixth aspect helps improve system performance.

In a possible embodiment, the network device may further send configuration information to the terminal device, where the configuration information is used to configure a time offset T. Based on this possible embodiment, the network device can configure the time offset T for the terminal device.

In a possible embodiment, the predicted channel information is a predicted PMI or a predicted channel coefficient.

According to a seventh aspect, this application provides a channel information feedback method. The method includes: A terminal device determines a plurality of pieces of predicted channel information based on one or more pieces of information of a time offset T, window duration, or a time domain feedback granularity; and the terminal device feeds back one or more pieces of predicted channel information to a network device. The method described in the seventh aspect helps improve system performance.

In a possible embodiment, the terminal device receives configuration information sent by the network device, where the configuration information is used to configure one or more of the time offset T, the window duration, or the time domain feedback granularity.

In a possible embodiment, a manner in which the terminal device feeds back the one or more pieces of predicted channel information to the network device is specifically: The terminal device feeds back channel information obtained through processing of a codebook to the network device, where the codebook is a codebook based on a time domain dimension, and the channel information obtained through processing of the codebook represents the one or more pieces of predicted channel information. Based on this possible embodiment, the channel information obtained through processing of the codebook is essentially information obtained after information compression is performed on one or more pieces of channel information. This helps save transmission resources.

In a possible embodiment, the predicted channel information is a predicted PMI or a predicated channel coefficient.

According to an eighth aspect, this application provides a channel information feedback method. The method includes: A network device receives one or more pieces of predicted channel information fed back by a terminal device. The method described in the eighth aspect helps improve system performance.

In a possible embodiment, the network device may further send configuration information to the terminal device, where the configuration information is used to configure one or more of a time offset T, window duration, or a time domain feedback granularity. Based on this possible embodiment, one or more of the time offset T, the window duration, or the time domain feedback granularity can be configured for the terminal device.

In a possible embodiment, a manner in which the network device receives the one or more pieces of predicted channel information fed back by the terminal device is specifically: The network device receives channel information, obtained through processing of a codebook, that is fed back by the terminal device, where the codebook is a codebook based on a time domain dimension, and the channel information obtained through processing of the codebook represents the one or more pieces of predicted channel information. Based on this possible embodiment, the channel information obtained through processing of the codebook is essentially information obtained after information compression is performed on one or more pieces of channel information. This helps save transmission resources.

In a possible embodiment, the predicted channel information is a predicted PMI or a predicted channel coefficient.

According to a ninth aspect, a communication apparatus is provided. The apparatus may be a terminal device, an apparatus in the terminal device, or an apparatus that can be used together with the terminal device. The communication apparatus may alternatively be a chip system. The communication apparatus may perform the method according to the first aspect, the third aspect, the fifth aspect, or the seventh aspect. A function of the communication apparatus may be implemented by hardware, or may be implemented by hardware executing corresponding software. The hardware or the software includes one or more units corresponding to the foregoing function. The unit may be software and/or hardware. For operations performed by the communication apparatus and beneficial effects of the communication apparatus, refer to the method and beneficial effects described in the first aspect, the third aspect, the fifth aspect, or the seventh aspect. Repeated parts are not described again.

According to a tenth aspect, a communication apparatus is provided. The apparatus may be a network device, an apparatus in the network device, or an apparatus that can be used together with the network device. The communication apparatus may alternatively be a chip system. The communication apparatus may perform the method according to the second aspect, the fourth aspect, the sixth aspect, or the eighth aspect. A function of the communication apparatus may be implemented by hardware, or may be implemented by hardware executing corresponding software. The hardware or the software includes one or more units corresponding to the foregoing function. The unit may be software and/or hardware. For operations performed by the communication apparatus and beneficial effects of the communication apparatus, refer to the method and beneficial effects described in the second aspect, the fourth aspect, the sixth aspect, or the eighth aspect. Repeated parts are not described again.

According to an eleventh aspect, this application provides a communication apparatus. The communication apparatus includes at least one processor. When the processor invokes a computer program in a memory, the method performed by the terminal device in the method according to the first aspect, the third aspect, the fifth aspect, or the seventh aspect is performed.

According to a twelfth aspect, this application provides a communication apparatus. The communication apparatus includes at least one processor. When the processor invokes a computer program in a memory, the method performed by the network device in the method according to the second aspect, the fourth aspect, the sixth aspect, or the eighth aspect is performed.

According to a thirteenth aspect, this application provides a communication apparatus. The communication apparatus includes a processor and a memory. The memory is configured to store a computer program. The processor is configured to execute the computer program stored in the memory, so that the communication apparatus performs the method performed by the terminal device in the method according to the first aspect, the third aspect, the fifth aspect, or the seventh aspect.

According to a fourteenth aspect, this application provides a communication apparatus. The communication apparatus includes a processor and a memory. The memory is configured to store a computer program. The processor is configured to execute the computer program stored in the memory, so that the communication apparatus performs the method performed by the network device in the method according to the second aspect, the fourth aspect, the sixth aspect, or the eighth aspect.

According to a fifteenth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory, to perform the method performed by the terminal device in the method according to the first aspect, the third aspect, the fifth aspect, or the seventh aspect.

According to a sixteenth aspect, this application provides a communication apparatus. The communication apparatus includes a processor, a memory, and a transceiver. The transceiver is configured to receive a signal or send a signal. The memory is configured to store a computer program. The processor is configured to invoke the computer program from the memory, to perform the method performed by the network device in the method according to the second aspect, the fourth aspect, the sixth aspect, or the eighth aspect.

According to a seventeenth aspect, this application provides a communication apparatus. The communication apparatus includes at least one processor and a communication interface. The processor runs a computer program, to perform the method performed by the terminal device in the method according to the first aspect, the third aspect, the fifth aspect, or the seventh aspect.

According to an eighteenth aspect, this application provides a communication apparatus. The communication apparatus includes at least one processor and a communication interface. The communication interface is configured to receive a computer program and transmit the computer program to the processor. The processor runs the computer program, to perform the method performed by the network device in the method according to the second aspect, the fourth aspect, the sixth aspect, or the eighth aspect.

According to a nineteenth aspect, this application provides a computer-readable storage medium. The computer-readable storage medium is configured to store instructions; and when the instructions are executed, the method performed by the terminal device in the method according to the first aspect, the third aspect, the fifth aspect, or the seventh aspect is implemented.

According to a twentieth aspect, this application provides a computer-readable storage medium. The computer-readable storage medium is configured to store instructions; and when the instructions are executed, the method performed by the network device in the method according to the second aspect, the fourth aspect, the sixth aspect, or the eighth aspect is implemented.

According to a twenty-first aspect, this application provides a computer program product including instructions. When the instructions are executed, the method performed by the terminal device in the method according to the first aspect, the third aspect, the fifth aspect, or the seventh aspect is implemented.

According to a twenty-second aspect, this application provides a computer program product including instructions. When the instructions are executed, the method performed by the network device in the method according to the second aspect, the fourth aspect, the sixth aspect, or the eighth aspect is implemented.

According to a twenty-third aspect, this application provides a communication system. The communication system includes the communication apparatus according to the ninth aspect, the eleventh aspect, the thirteenth aspect, the fifteenth aspect, or the seventeenth aspect and the communication apparatus according to the tenth aspect, the twelfth aspect, the fourteenth aspect, the sixteenth aspect, or the eighteenth aspect.

DESCRIPTION OF EMBODIMENTS

The following further describes specific embodiments of this application in detail with reference to accompanying drawings.

To better understand embodiments of this application, the following describes a system architecture to which embodiments of this application are applicable.

Figure 2:
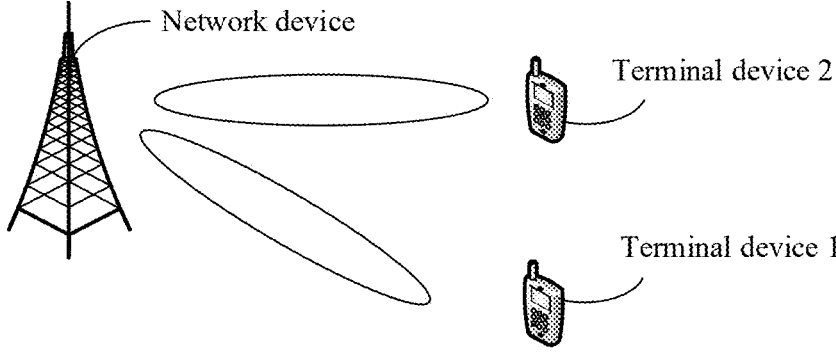
FIG. 2 is a schematic diagram of a system architecture according to an embodiment of this application.

FIG. 2 is a schematic diagram of a system architecture according to an embodiment of this application. As shown in FIG. 2, the system architecture includes a network device and at least one terminal device. In FIG. 2, an example in which the system architecture includes one network device and two terminal devices is used for description. Certainly, the system architecture may further include more network devices and terminal devices. The network device may communicate with the terminal device by using a massive multiple-input multiple-output (massive MIMO) technology.

The network device in embodiments of this application is an entity on a network side that is configured to transmit or receive a signal, may be configured to mutually convert a received over-the-air frame and an internet protocol (internet protocol, IP) packet, and serves as a router between a terminal device and a remaining part of an access network. The remaining part of the access network may include an IP network and the like. The network device may further coordinate attribute management of an air interface. For example, the network device may be an evolved NodeB (evolved NodeB, eNB or eNodeB) in LTE, a new radio controller (NR controller), a gNodeB (gNB) in a 5G system, a centralized network element (centralized unit), a new radio base station, a radio remote module, a micro base station, a relay, a distributed network element (distributed unit), a transmission reception point (TRP), a transmission point (TP), or any other radio access device. However, embodiments of this application are not limited thereto.

The terminal device in embodiments of this application is an entity on a user side that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device, user equipment (UE), or the like. The terminal device may be a mobile terminal, for example, a mobile phone (or referred to as a "cellular" phone) or a computer that has a mobile terminal. For example, the terminal device may be a portable, pocket-sized, handheld, computer built-in, or vehicle-mounted mobile apparatus, which exchanges voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, embodiments of this application are not limited thereto.

Figure 1:
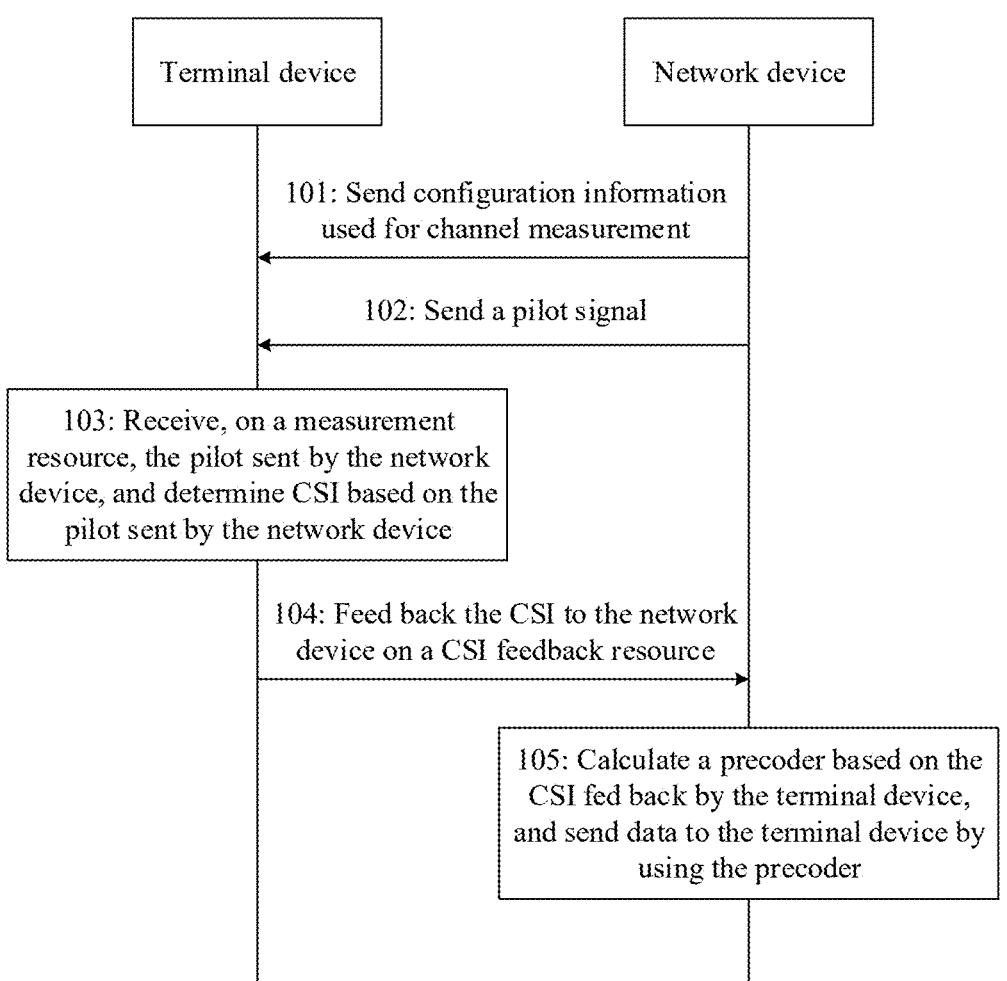
FIG. 1 is a schematic diagram of an existing CSI feedback procedure.

Currently, there is a problem of low system performance when data is sent to the terminal device by using a precoder determined through the procedure described in FIG. 1. The following analyzes causes of low system performance in a multi-user moving scenario.

Figure 3:
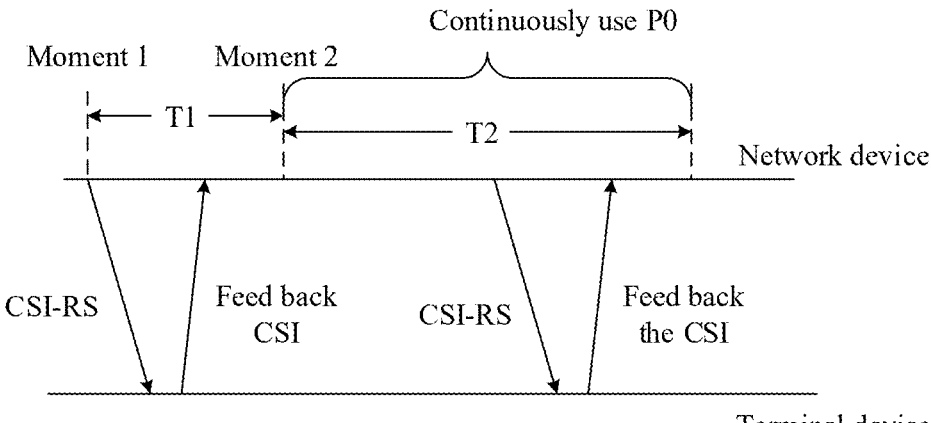
FIG. 3 is a schematic flowchart of CSI measurement and feedback in the existing protocol Rel-15.

FIG. 3 is a schematic flowchart of channel state information (CSI) measurement and feedback in the existing protocol Rel-15. As shown in FIG. 3, a network device sends a channel state information reference signal (CSI-RS) at a moment 1. After measuring the CSI-RS, a terminal device obtains CSI, and sends the CSI to the network device. After receiving the CSI, the network device obtains a precoder P0 based on the CSI, and sends downlink data at a moment 2 by using the precoder P0. It can be learned that the CSI fed back by the terminal device is CSI corresponding to the moment 1, and actual CSI of a channel when the network device performs downlink transmission is CSI corresponding to the moment 2. Therefore, there is a delay between the CSI fed back by the terminal device and the actual CSI of the channel when the network device performs downlink transmission, and the delay is T1. There is an error between a precoder calculated by the network device based on expired CSI and a precoder corresponding to an actual channel, and this causes a performance loss during downlink data transmission. This problem causes a more obvious performance loss in a time-varying channel scenario (for example, a scenario in which the terminal device moves). In the multi-user moving scenario, the performance loss is greater.

In addition, the network device usually calculates a precoder by using latest fed-back CSI, and assumes that the precoder remains unvaried before a next CSI update. For example, if a CSI feedback periodicity is T2, as shown in FIG. 3, the network device continuously sends downlink data in the time window T2 by using the latest calculated precoder P0. However, when a channel rapidly varies within time T2, for example, in a moving scenario, the precoder P0 does not match the precoder corresponding to the actual channel. This causes performance deterioration.

To improve system performance, embodiments of this application provide a channel information feedback method and a communication apparatus. The following describes in detail a channel information feedback method and a communication apparatus that are provided in this application.

Figure 4:
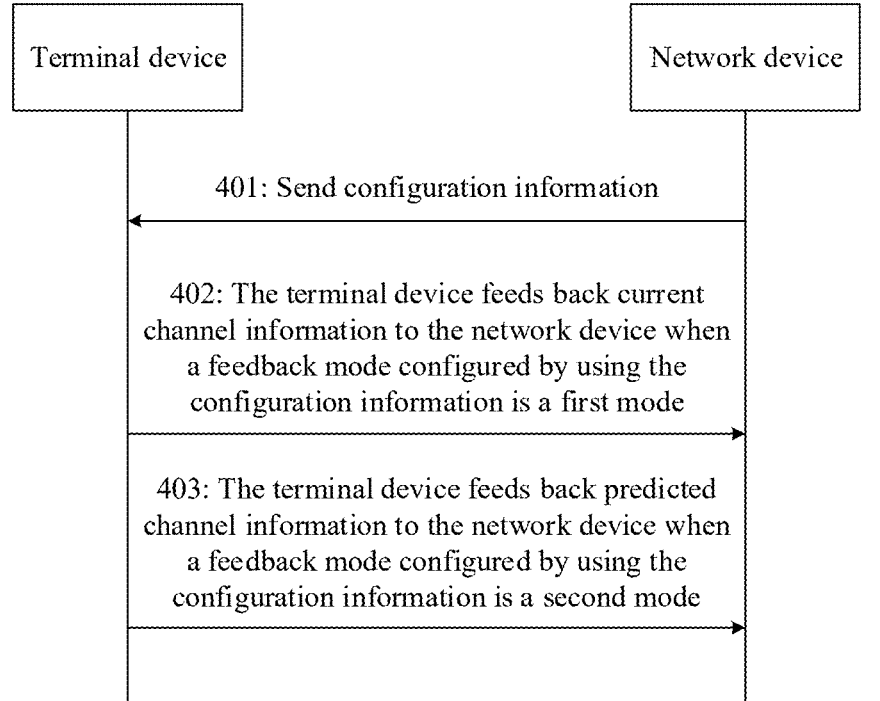
FIG. 4 is a schematic flowchart of a channel information feedback method according to an embodiment of this application.

FIG. 4 is a schematic flowchart of a channel information feedback method according to an embodiment of this application. As shown in FIG. 4, the channel information feedback method includes the following operation 401 to operation 403. The method shown in FIG. 4 may be performed by a network device and a terminal device. Alternatively, the method shown in FIG. 4 may be performed by a chip in the network device and a chip in the terminal device. In FIG. 4, an example in which the network device and the terminal device are execution bodies is used for description.

401: The network device sends configuration information to the terminal device.

The configuration information is used to configure a feedback mode of channel information. When the feedback mode configured by using the configuration information is a first mode, the feedback mode is used to indicate the terminal device to feed back current channel information; or when the feedback mode configured by using the configuration information is a second mode, the feedback mode is used to indicate the terminal device to feed back predicted channel information. The feedback mode may also be referred to as a report mode. The channel information is channel-related information. For example, the channel information may be a precoding matrix indicator (precoding matrix indicator, PMI), a channel coefficient, or the like. The channel coefficient may be a space-frequency domain channel matrix H, an angle-delay domain channel coefficient C, or an equivalent channel coefficient in another domain.

A form of the configuration information may be one of the following two forms.

Alternatively, the configuration information may be used to configure the feedback mode in another form. This is not limited in this embodiment of this application.

Form 1: The configuration information includes an identifier of the feedback mode. For example, if the configuration information is used to configure the first mode, the configuration information includes an identifier of the first mode. If the configuration information is used to configure the second mode, the configuration information includes an identifier of the second mode.

Form 2: The configuration information includes a first parameter. When the first parameter meets a first condition, the configuration information is used to configure the first mode; or when the first parameter meets a second condition, the configuration information is used to configure the second mode, and the first condition is different from the second condition. The first parameter may be a time offset T or a prediction algorithm parameter, or the first parameter may be another parameter. For example, the prediction algorithm parameter may be an autoregressive model (autoregressive model, AR model) order or a parameter of another prediction algorithm (for example, a Doppler frequency estimation algorithm).

For example, when the first parameter is greater than or equal to 0, the configuration information is used to configure the first mode; or when the first parameter is less than 0, the configuration information is used to configure the second mode. Alternatively, when the first parameter is greater than 0, the configuration information is used to configure the first mode; or when the first parameter is less than or equal to 0, the configuration information is used to configure the second mode. Herein, 0 is merely an example. During embodiments of an implementation, a specified value may also be used as a threshold to distinguish the first condition from the second condition.

In a possible embodiment, the network device may send the configuration information to the terminal device by using any one or any combination of radio resource control (RRC) signaling, downlink control information (DCI), or a media access control control element (MAC CE).

In a possible embodiment, the configuration information may be further used to configure a CSI-RS measurement resource and a channel information feedback resource. Information that is in the configuration information and that is used to configure the feedback mode and information that is in the configuration information and that is used to configure the CSI-RS measurement resource and the channel information feedback resource may be sent to the terminal device in same signaling, or may be sent to the terminal device in different signaling.

402: The terminal device feeds back the current channel information to the network device when the feedback mode configured by using the configuration information is the first mode.

403: The terminal device feeds back the predicted channel information to the network device when the feedback mode configured by using the configuration information is the second mode.

In this embodiment of this application, after the terminal device receives the configuration information, the terminal device feeds back the current channel information to the network device when the feedback mode configured by using the configuration information is the first mode; or the terminal device feeds back the predicted channel information to the network device when the feedback mode configured by using the configuration information is the second mode. Correspondingly, the network device receives the current channel information fed back by the terminal device when the feedback mode configured by using the configuration information is the first mode. After receiving the current channel information, the network device determines a precoder based on the current channel information, and sends downlink data by using the precoder. The network device receives the predicted channel information fed back by the terminal device when the feedback mode configured by using the configuration information is the second mode. After receiving the predicted channel information, the network device determines a precoder based on the predicted channel information, and sends downlink data at a corresponding moment by using the precoder.

The current channel information may be channel information corresponding to a moment at which the channel information is fed back, or the current channel information may be channel information corresponding to a moment at which a CSI-RS is latest effectively measured. Alternatively, the current channel information may be channel information fed back by the terminal device in the existing protocol Rel-15. The current channel information may be obtained based on a latest effectively measured CSI-RS. Alternatively, the current channel information may be determined based on a latest effectively measured CSI-RS and historical channel information.

The predicted channel information is relative to the current channel information, and refers to channel information obtained by predicting channel information at a moment after a moment at which the channel information is fed back. The predicted channel information may be channel information obtained by predicting, based on the latest effectively measured CSI-RS and the historical channel information, channel information at a moment after a moment or a future moment at which the channel information is fed back. The terminal device may predict the channel information at a future moment based on an algorithm such as Doppler frequency estimation or an AR autoregressive model, or the terminal device may predict the channel information based on another algorithm. This is not limited in this embodiment of this application.

In a possible embodiment, the current channel information is a current PMI, and the predicted channel information is a predicted channel coefficient. The channel coefficient may be a space-frequency domain channel matrix H or an angle-delay domain channel coefficient C. If the terminal device feeds back the predicted channel coefficient, after receiving the predicted channel coefficient, the network device obtains a predicted PMI based on the predicted channel coefficient. Then, the network device determines a precoder based on the predicted PMI, and sends downlink data at a corresponding moment by using the precoder. Alternatively, the network device may directly determine a precoder based on the predicted channel coefficient. This is not specifically limited herein. Based on this possible embodiment, feeding back the current PMI can be compatible with an existing channel information feedback solution, and this can reduce feedback overheads. Because a channel coefficient can more comprehensively represent a channel time domain characteristic, the terminal device feeds back the predicted channel coefficient, so that the network device can obtain a more comprehensive channel time domain characteristic. Therefore, the network device may correct, with reference to a predicted channel coefficient fed back by another device, the predicted channel coefficient fed back by the terminal device, so that the predicted channel coefficient is more accurate. This helps improve the system performance.

In a possible embodiment, the current channel information is a current channel coefficient, and the predicted channel information is a predicted PMI. In this possible embodiment, if the terminal device feeds back the current channel coefficient, after receiving the current channel coefficient, the network device obtains a current PMI based on the current channel coefficient. Then, the network device determines a precoder based on the current PMI, and sends downlink data at a corresponding moment by using the precoder. Alternatively, the network device may directly determine a precoder based on the predicted channel coefficient. This is not specifically limited herein.

In a possible embodiment, the current channel information is a current PMI, and the predicted channel information is a predicted PMI.

In a possible embodiment, the current channel information is a current channel coefficient, and the predicted channel information is a predicted channel coefficient.

In a possible embodiment, the PMI fed back by the terminal device is determined based on a possible quantity of transport streams (a quantity of ranks)/quantity of transport layers (a quantity of layers) of the terminal device. The channel coefficient fed back by the terminal device is determined based on a quantity of receive antennas of the terminal device.

When a moving speed of the terminal device is relatively low, the network device sends the downlink data by using the precoder determined based on the current channel information, and a performance loss of the downlink data during transmission is relatively small. Therefore, when the moving speed of the terminal device is relatively low, the network device may configure the first mode, to indicate the terminal device to feed back the current channel information. This reduces feedback overheads. When the moving speed of the terminal device is relatively high, the network device sends the downlink data by using the precoder determined based on the predicted channel information. This helps reduce a performance loss of the downlink data during transmission. Therefore, when the moving speed of the terminal device is relatively high, the network device may configure the second mode, to indicate the terminal device to feed back the predicted channel information. It can be learned that, based on the method described in FIG. 4, the current channel information and the predicted channel information may be selectively fed back based on the feedback mode, so that channel information feedback requirements in different scenarios can be met. In particular, a problem that data transmission performance deteriorates because channel information expires in a moving scenario can be resolved by feeding back the predicted channel information. This helps improve system performance.

The following describes two embodiments in which the terminal device feeds back the predicted channel information to the network device.

Manner 1: The terminal device determines the predicted channel information based on a time offset T when the feedback mode configured by using the configuration information is the second mode; and the terminal device feeds back the predicted channel information to the network device. Based on Manner 1, the terminal device may predict and report the predicted channel information for which the time offset T is compensated, to match a channel during actual transmission. This avoids a problem that data transmission performance deteriorates because channel information easily expires in a moving scenario, and improves the system performance.

In a possible embodiment, when the configuration information is used to configure the second mode, the configuration information may be further used to configure the time offset T. Information that is in the configuration information and that is used to configure the feedback mode and information that is in the configuration information and that is used to configure the time offset T may be sent to the terminal device in same signaling, or may be sent to the terminal device in different signaling. Alternatively, the time offset T may be specified in a protocol in advance.

In a possible embodiment, when the channel information is periodically fed back or semi-periodically fed back, the time offset T may be any one of the following three offsets: 1. The time offset T is a period of time in which the moment at which the channel information is fed back is used as a start point. 2. The time offset T is a period of time in which the moment at which the CSI-RS is latest effectively measured is used a start point. In an embodiment, the time offset T may be greater than or equal to X. X is a time interval between the moment at which the CSI-RS is latest effectively measured and the moment at which the channel information is fed back. An effective CSI measurement moment means that X is greater than or equal to n_(cqi_ref). n_(cqi_ref) is a time interval ahead of an uplink slot t1 (namely, the moment at which the channel information is fed back). 3. The time offset T is a period of time in which an uplink slot t1-n_(cqi_ref) is used a start point. In an embodiment, the time offset T may be greater than or equal to n_(cqi_ref). Generally, for the uplink slot t1, t1-n_(cqi_ref) indicates a corresponding latest downlink slot that can be used for effective CSI-RS measurement when an uplink CSI feedback is performed in the uplink slot t1.

Example 1-1: For example, the channel information is periodically fed back, and the current channel information is the PMI corresponding to the moment at which the CSI-RS is latest effectively measured. The terminal device receives the configuration information sent by the network device, where the configuration information is used to configure the feedback mode of the channel information, the CSI-RS measurement resource, and the channel information feedback resource. A feedback periodicity of the channel information is N slots. When the configuration information is used to configure the second feedback mode, the configuration information is further used to configure the time offset T. T is a period of time in which the moment at which the channel information is fed back is used as a start point.

Figure 5:
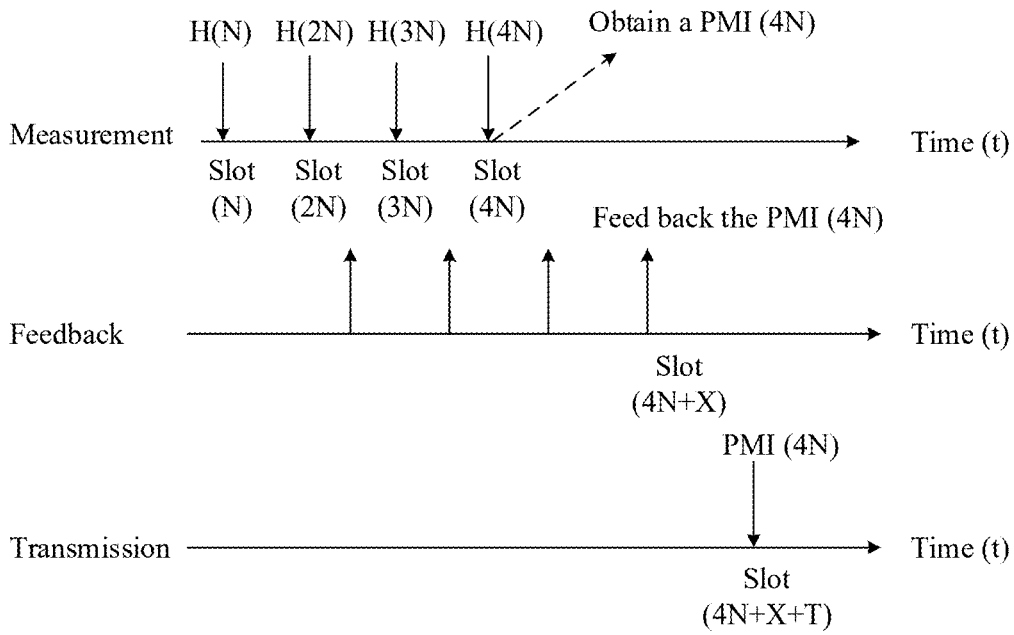
FIG. 5 is a schematic diagram of a channel information feedback according to an embodiment of this application.

When the feedback mode configured by using the configuration information is the first mode, as shown in FIG. 5, the terminal device measures the CSI-RS in a slot (4N), to obtain a channel matrix H(4N) corresponding to the slot (4N), and obtains a PMI (4N) corresponding to the slot (4N) based on the channel matrix H(4N). The terminal device feeds back the PMI (4N) in a slot (4N+X). After receiving the PMI (4N), the network device sends downlink data in a slot (4N+X+T) by using a precoder determined based on the PMI (4N). X is a time interval between the moment at which the CSI-RS is latest effectively measured and the moment at which the corresponding channel information is fed back.

Figure 6:
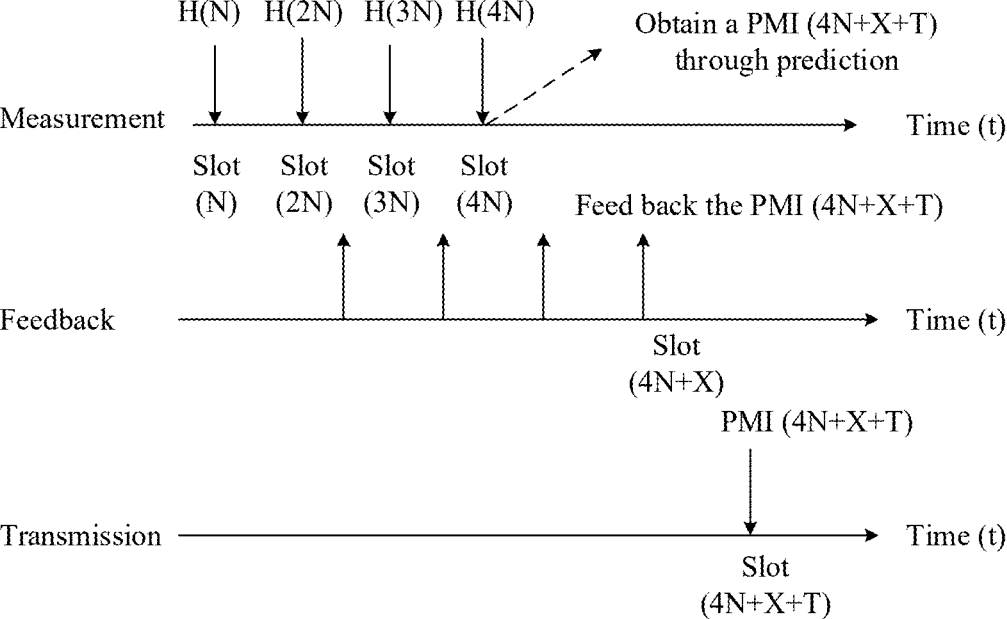
FIG. 6 is a schematic diagram of another channel information feedback according to an embodiment of this application.

When the feedback mode configured by using the configuration information is the second mode, as shown in FIG. 6, the terminal device measures the CSI-RS in a slot (4N), to obtain a channel matrix H(4N) corresponding to the slot (4N). The terminal device obtains, through prediction based on the channel matrix H(4N), a historical channel matrix H(N) to a historical channel matrix H(3N), and the time offset T, a channel matrix H(4N+X+T) corresponding to a slot (4N+X+T).

The terminal device obtains a predicted PMI (4N+X+T) based on the channel matrix H(4N+X+T). The terminal device feeds back the predicted PMI (4N+X+T) in a slot (4N+X). After receiving the predicted PMI (4N+X+T), the network device sends downlink data in the slot (4N+X+T) by using a precoder determined based on the PMI (4N+X+T).

In a possible embodiment, when the channel information is aperiodically fed back, the time offset T may be any one of the following three offsets: 1. The time offset T is a period of time in which a moment t2 at which the terminal device receives trigger signaling is used as a start point. In an embodiment, the time offset T may be greater than or equal to a time interval between the moment t2 and the moment at which the channel information is fed back. The trigger signaling is signaling used to trigger CSI-RS measurement, and the trigger signaling may be DCI signaling. 2. The time offset T is a period of time in which the moment at which the channel information is fed back is used as a start point. 3. The time offset T is a period of time in which the moment at which the CSI-RS is latest effectively measured is used as a start point, and the time offset T is greater than or equal to a time interval between the moment at which the channel information is fed back and the moment, at which the CSI is latest effectively measured, corresponding to the moment at which the channel information is fed back.

Example 1-2: For example, the channel information is aperiodically fed back, and the current channel information is the PMI corresponding to the moment at which the CSI-RS is latest effectively measured. The terminal device receives, at a moment t2, DCI signaling used to trigger CSI-RS measurement. The DCI signaling carries the configuration information, and the configuration information is used to configure the feedback mode of the channel information, the CSI-RS measurement resource, and the channel information feedback resource. The moment at which the CSI-RS is latest effectively measured is t2+t3, and the moment at which the channel information is fed back is t2+t4. When the configuration information is used to configure the second feedback mode, the configuration information is further used to configure the time offset T. T is a period of time in which the moment t2 corresponding to DCI for triggering CSI-RS measurement is used as a start point.

Figure 7:
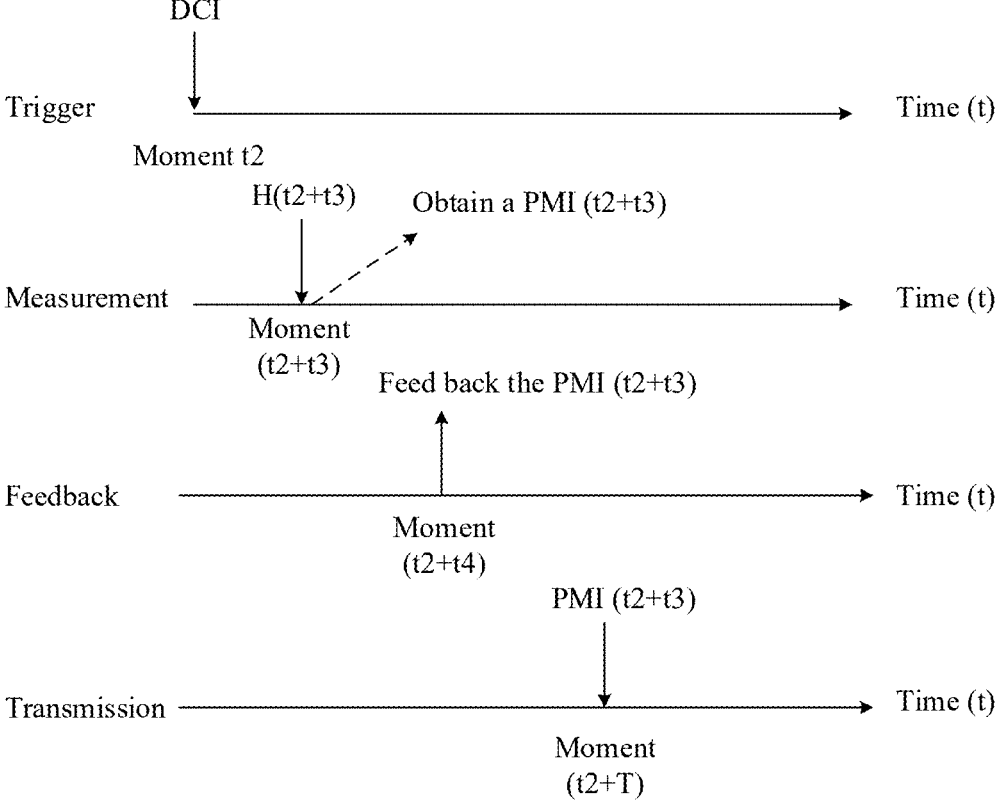
FIG. 7 is a schematic diagram of still another channel information feedback according to an embodiment of this application.

When the feedback mode configured by using the configuration information is the first mode, as shown in FIG. 7, the terminal device measures the CSI-RS at the moment t2+t3, to obtain a channel matrix H(t2+t3) corresponding to the moment t2+t3, and obtains a PMI (t2+t3) corresponding to the moment t2+t3 based on the channel matrix H(t2+t3). The terminal device feeds back the PMI (t2+t3) at the moment (t2+t4). After receiving the PMI (t2+t3), the network device sends downlink data at a moment (t2+T) by using a precoder determined based on the PMI (t2+t3).

Figure 8:
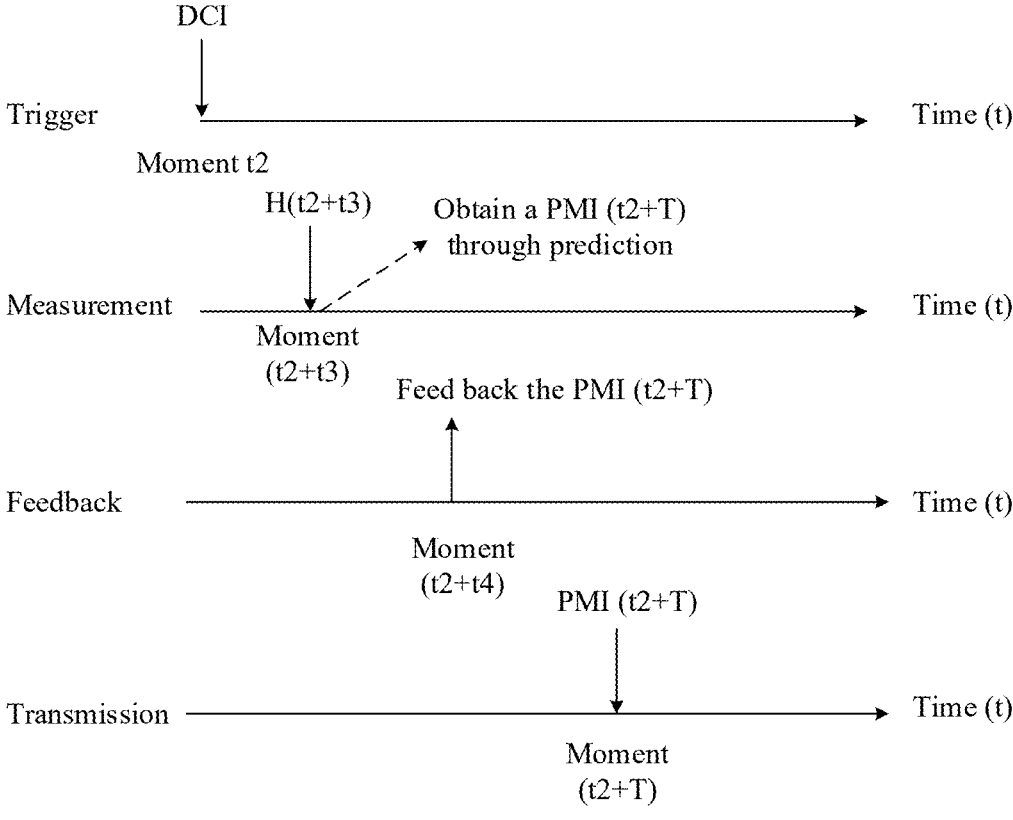
FIG. 8 is a schematic diagram of still another channel information feedback according to an embodiment of this application.

When the feedback mode configured by using the configuration information is the second mode, as shown in FIG. 8, the terminal device measures the CSI-RS at the moment t2+t3, to obtain a channel matrix H(t2+t3) corresponding to the moment t2+t3, and obtains a predicted PMI (t2+T) based on the channel matrix H(t2+t3), a historically measured channel matrix, and the time offset T. The terminal device feeds back the predicted PMI (t2+T) at the moment (t2+t4). After receiving the predicted PMI (t2+T), the network device sends downlink data at a moment (t2+T) by using a precoder determined based on the predicted PMI (t2+T). In Example 1-2, alternatively, T may use the CSI measurement moment t2+t3 or the CSI feedback moment t2+t4 as a start point. Principles are consistent, and therefore descriptions are not repeatedly provided. The following describes a principle of the predicted channel matrix H.

A time-varying characteristic of a channel is represented by a Doppler frequency, and varying of the Doppler frequency is usually more slowly than that of the channel in time domain, so that channels have correlation in time domain. Because the channels have correlation in time domain, a future channel may be obtained through prediction based on time domain correlation of the channel matrix H.

For example, for O+L times of channel measurement, a channel matrix [H(1), H(2), ..., H(O+L)] may be obtained. Then, H(n) may be projected to an angle-delay domain, where n=1, 2, ..., O+L. The following uses one angle-delay pair as an example, and a principle of another angle-delay pair is the same as that of this angle-delay pair. For an angle-delay pair, a corresponding angle-delay domain channel coefficient C=[c(1), c(2), ..., c(O+L)] is obtained, where C may be a $1\times$ (O+L) vector, c(1), c(2), ..., c(O+L) are elements of C. In this case, a time domain vector [c(1), c(2), ..., c(O+L)] of a space-frequency coefficient may be represented as equations of L unknown numbers, and L weighting coefficients a={a1, ..., aL} are obtained through calculation.

It is assumed that for an angle-delay pair, measurement channels (or sampling channels) of the angle-delay pair at (O+L) moments are c(1), c(2), ..., c(O+L). Based on an AR model, an equation may be expressed as follows:

$$\begin{bmatrix} c(1) & \cdots & c(L) \\ \vdots & \ddots & \vdots \\ c(O) & \cdots & c(O+L-1) \end{bmatrix} \begin{bmatrix} a_1 \\ \vdots \\ a_L \end{bmatrix} = \begin{bmatrix} c(L+1) \\ \vdots \\ c(O+L) \end{bmatrix},$$

where $\{a_1, ..., a_L\}$ are the L weighting coefficients, and c(1) to c(O+L) are all known measurement channels (or known sampling channels). The equation may be simply understood as that any $(L+1)^{th}$ channel may be represented as a weighted sum of the weighting coefficients $\{a_1, ..., a_L\}$ of the first L channels.

It should be understood that, in the foregoing formula, a start position of each row may be independent, provided that spacings between channel samples in the rows are aligned, that is, time intervals are the same. For example, three rows are used as an example, a start position of the first row may be c(1), for example, the first row may be c(1), c(2), and c(3); a start position of the second row may be c(4), for example, the second row may be c(4), c(5), and c(6); and a start position of the third row may be c(2), for example, the third row may be c(2), c(3), and c(4).

a may be obtained through calculation by using a= $X_1^{-1}Y_1$. $X_1$ is $$\begin{bmatrix} c(1) & \cdots & c(L) \\ \vdots & \ddots & \vdots \\ c(O) & \cdots & c(O+L-1) \end{bmatrix},$$

$Y_1$ is $$\begin{bmatrix} c(L+1) \\ \vdots \\ c(O+L) \end{bmatrix},$$

and a is $$\begin{bmatrix} a_1 \\ \vdots \\ a_L \end{bmatrix}.$$

The L weighting coefficients a={$a_1$, ..., $a_L$} may be calculated based on O equations (or O groups of measurement channels). The weighting coefficients $\{a_1, \ldots, a_L\}$ can be more robust by using the O equations.

It should be understood that the foregoing formula is merely an example for description, and this embodiment of this application is not limited thereto. Any variation of the formula falls within the protection scope of this embodiment of this application. In addition, the channel sampling in the foregoing formula may also be a channel matrix H, that is, c(n) in the foregoing formula may be replaced with H(n). For example, space-frequency matrices obtained through measurement at (O+L) moments are H(1), H(2), . . . , H(O+L). Based on the AR model, an equation may be expressed as follows:

$$
\begin{bmatrix} H(1) & \cdots & H(L) \\ \vdots & \ddots & \vdots \\ H(O) & \cdots & H(O+L-1) \end{bmatrix} \begin{bmatrix} a_1 \\ \vdots \\ a_L \end{bmatrix} = \begin{bmatrix} H(L+1) \\ \vdots \\ H(O+L) \end{bmatrix},
$$

where $\{a_1, \ldots, a_L\}$ are the L weighting coefficients, and H(1) to H(O+L) are all known measurement channels (or known sampling channels, namely, space-frequency matrices obtained through channel measurement).

a may be obtained through calculation by using a= $X_2^{-1}Y_2$. $X_2$ is $$
\begin{bmatrix} H(1) & \cdots & H(L) \\ \vdots & \ddots & \vdots \\ H(O) & \cdots & H(O+L-1) \end{bmatrix},
$$

$$
Y_2 \text{ is } \begin{bmatrix} H(L+1) \\ \vdots \\ H(O+L) \end{bmatrix},
$$

and $$
a \text{ is } \begin{bmatrix} a_1 \\ \vdots \\ a_L \end{bmatrix}.
$$

For example, a may be a least squares solution of the foregoing equation. It should be understood that the foregoing formula is merely an example for description, and this embodiment of this application is not limited thereto. Any variation of the formula falls within the protection scope of this embodiment of this application. It should be further understood that c(n) and H(n) are used as examples for description. This embodiment of this application is not limited thereto. Any manner in which a channel can be represented falls within the protection scope of this embodiment of this application.

After the sum coefficient a=$\{a_1, \ldots, a_L\}$ is calculated, based on an existing channel coefficient [c(O+1), c(O+2), . . . , c(O+L)] obtained through measurement, a channel c(O+L+1)=a1 c(O+1)+ . . . +$a_L$ c(O+L) at a subsequent moment may be predicted. Then, a corresponding channel matrix H(O+L+1) may be obtained by using c(O+L+1).

Manner 2: When the feedback mode configured by using the configuration information is the second mode, the terminal device determines a plurality of pieces of predicted channel information based on one or more of information of the time offset T, window duration, or a time domain feedback granularity, where the window duration is a time interval between moments of the first piece of channel information and the last piece of channel information in the plurality of pieces of predicted channel information, and the time domain feedback granularity is a time interval between moments at which two adjacent pieces of channel information are fed back; and the terminal device feeds back one or more pieces of predicted channel information to the network device. For related descriptions of the time offset T, refer to the foregoing corresponding descriptions. Details are not described herein again. Based on Manner 2, the terminal device may feed back the one or more pieces of predicted channel information, so that the network device can use the predicted channel information to perform matching on a time-varying channel within the window duration. This further improves system performance.

In a possible embodiment, when the feedback mode configured by using the configuration information is the second mode, the configuration information is further used to configure one or more of the time offset T, the window duration, or the time domain feedback granularity. Information that is in the configuration information and that is used to configure the feedback mode and information that is in the configuration information and that is used to configure the time offset T, the window duration, or the time domain feedback granularity may be sent to the terminal device in same signaling, or may be sent to the terminal device in different signaling. Alternatively, the time offset T, the window duration, or the time domain feedback granularity may be specified in a protocol in advance.

In a possible embodiment, the terminal device determines the plurality of pieces of predicted channel information based on the time offset T and the window duration, and then feeds back at least two pieces of predicted channel information from the plurality of pieces of predicted channel information based on the feedback granularity.

Example 2-1: For example, the channel information is periodically fed back. The terminal device receives the configuration information sent by the network device, where the configuration information is used to configure the feedback mode of the channel information to be the second mode, and configure the CSI-RS measurement resource, the channel information feedback resource, the time offset T, the window duration D, and the time domain feedback granularity M. T is a period of time in which the moment at which the channel information is fed back is used as a start point.

Figure 9:
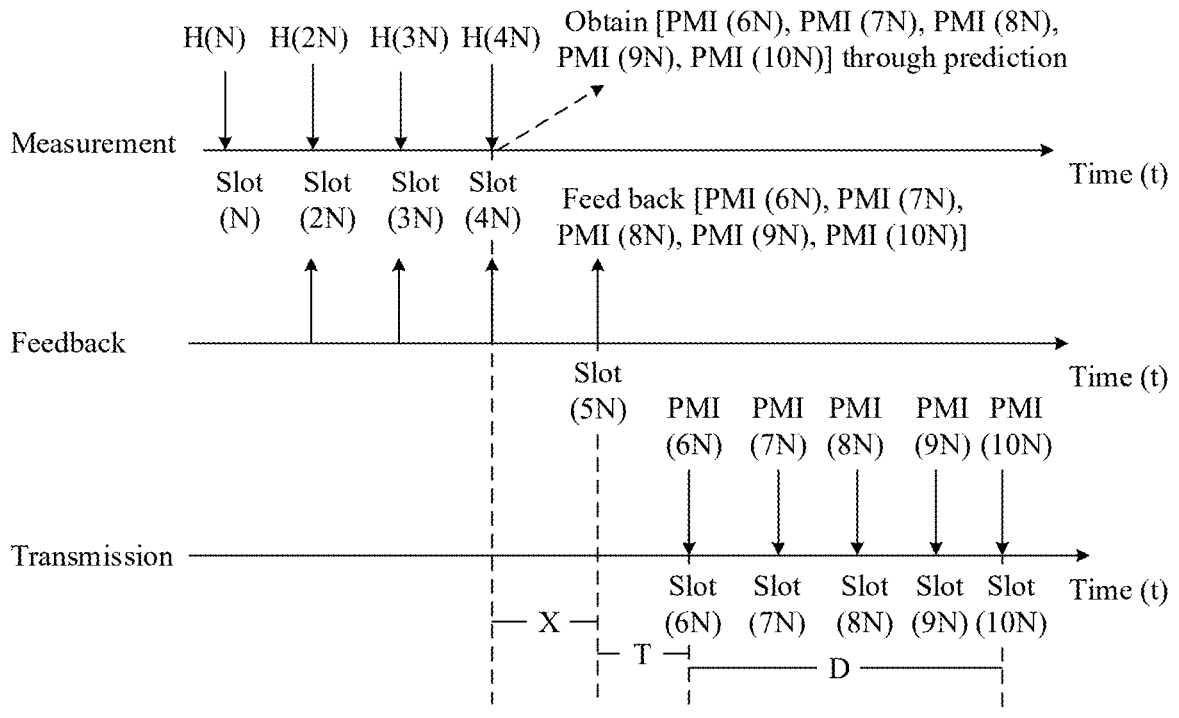
FIG. 9 is a schematic diagram of still another channel information feedback according to an embodiment of this application.

As shown in FIG. 9, the terminal device measures the CSI-RS in a slot (4N), to obtain a channel matrix H(4N). The terminal device predicts a channel matrix H(4+X+T), a channel matrix H(4N+X+T+1), . . . , a channel matrix H(4N+X+T+N) based on channel matrices H(N) to H(4N). X is a time interval between the moment at which channel information is fed back and the moment at which the CSI-RS is latest effectively measured. In FIG. 9, for example, X is N slots, the time offset T is N slots, the time domain feedback granularity M is N slots, and the window duration D is 4N slots. Therefore, the terminal device obtains a channel matrix H(6N) to a channel matrix H(10N) through prediction based on the foregoing solution. The terminal device obtains a predicted PMI (6N) to a predicted PMI (10N) based on the predicted channel matrix H(6N) to the predicted channel matrix H(10N). Because the time domain feedback granularity M is N slots, the terminal device feeds back the predicted PMI (6N) to the predicted PMI (10N) in a slot (4N+X). After receiving the predicted PMI (6N) to the predicted PMI (10N), the network device sends downlink data in a corresponding slot by using a precoder determined based on a corresponding PMI.

Figure 10:
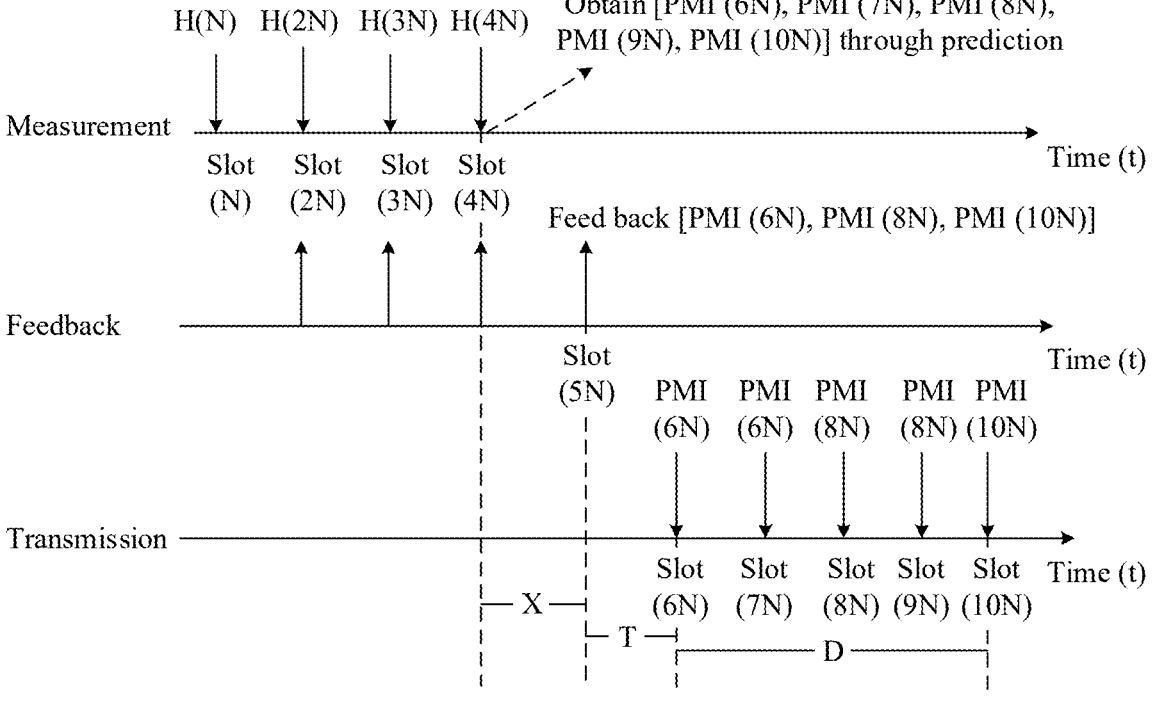
FIG. 10 is a schematic diagram of still another channel information feedback according to an embodiment of this application.

Example 2-2: For example, M is 2N slots. As shown in FIG. 10, the terminal device obtains a PMI (6N) to a PMI (10N) through prediction in the manner of example 2-1. The time domain feedback granularity M is 2N slots. Therefore, the terminal device feeds back the predicted PMI (6N), the predicted PMI (8N), and the predicted PMI (10N) in a slot (4N+X). After receiving the predicted PMI (6N), the predicted PMI (8N), and the predicted PMI (10N), the network device sends downlink data in a slot (6N) and a slot (7N) by using a precoder obtained based on the PMI (6N), sends downlink data in a slot (8N) and a slot (9N) by using a precoder obtained based on the PMI (8N), and sends downlink data in a slot (10N) by using a precoder obtained based on the PMI (10N). Alternatively, the network side device may perform interpolation on the PMI at an intermediate moment based on the PMI (6N), the PMI (8N), and the PMI (10N), to obtain the PMI (7N) and the PMI (9N). This is not limited herein.

In a possible embodiment, the terminal device determines the plurality of pieces of predicted channel information based on the time offset T, the window duration, and the time domain feedback granularity, and feeds back the plurality of pieces of predicted channel information. Based on this possible embodiment, processing resources are saved.

Figure 11:
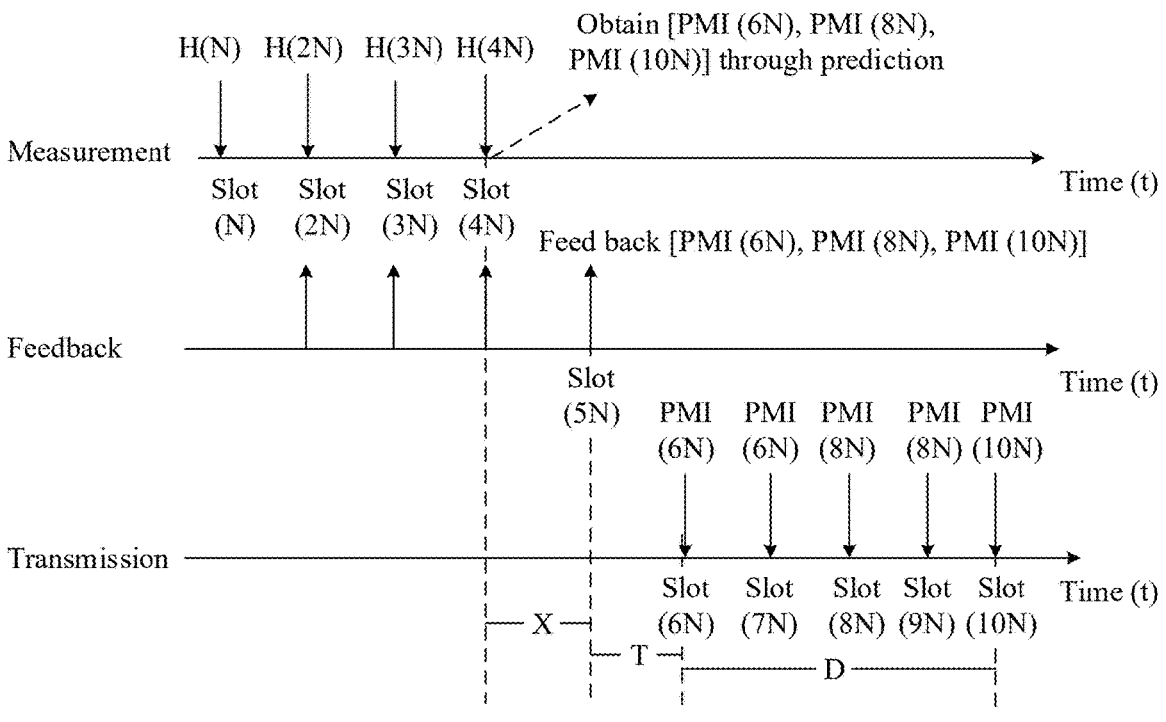
FIG. 11 is a schematic diagram of still another channel information feedback according to an embodiment of this application.

Example 2-3: X is N slots, the time offset T is N slots, the time domain feedback granularity M is 2N slots, and the window duration D is 4N slots. X is a time interval between the moment at which the channel information is fed back and the moment at which the CSI-RS is latest effectively measured. T is a period of time in which the moment at which the channel information is fed back is used as a start point. As shown in FIG. 11, the terminal device predicts a channel matrix H(4N+X+T), a channel matrix H(4N+X+T+2), . . . , a channel matrix H(4N+X+T+N) in a slot (4N). That is, the terminal device predicts a channel matrix H(6N), a channel matrix H(8N), and a channel matrix H(10N) in the slot (4N). The terminal device obtains a predicted PMI (6N), a predicted PMI (8N), and a predicted PMI (10N) based on the predicted channel matrix H(6N), the predicted channel matrix H(8N), and the predicted channel matrix H(10N). The terminal device feeds back the predicted PMI (6N), the predicted PMI (8N), and the predicted PMI (10N) in a slot (4N+X). After receiving the predicted PMI (6N), the predicted PMI (8N), and the predicted PMI (10N), the network device sends downlink data in a slot (6N) and a slot (7N) by using a precoder obtained based on the PMI (6N), sends downlink data in a slot (8N) and a slot (9N) by using a precoder obtained based on the PMI (8N), and sends downlink data in a slot (10N) by using a precoder obtained based on the PMI (10N). Alternatively, the network side device may perform interpolation on the PMI at an intermediate moment based on the PMI (6N), the PMI (8N), and the PMI (10N), to obtain the PMI (7N) and the PMI (9N). This is not limited herein.

In a possible embodiment, the terminal device determines the plurality of pieces of predicted channel information based on the time offset T and the window duration D, and selects any one or more pieces of the plurality of pieces of predicted channel information for feedback, or feeds back an average value of the plurality of pieces of predicted channel information. Based on this possible embodiment, transmission resources are saved.

Figure 12:
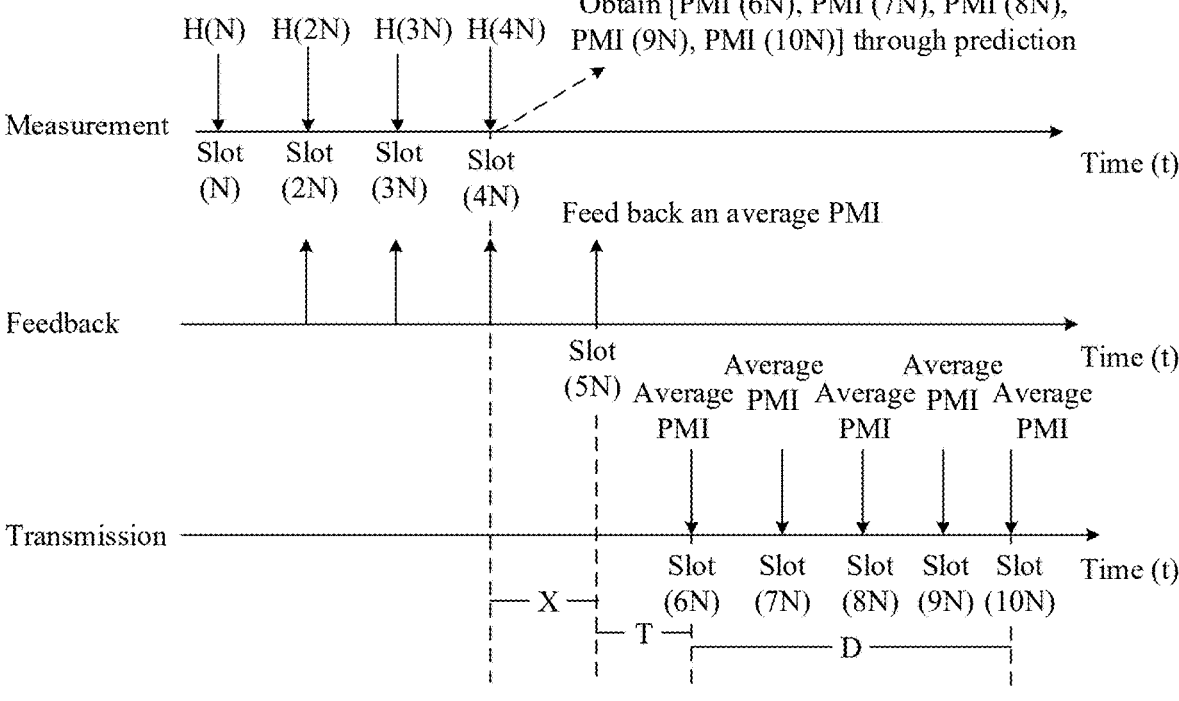
FIG. 12 is a schematic diagram of still another channel information feedback according to an embodiment of this application.

Example 2-4: As shown in FIG. 12, the terminal device obtains a PMI (6N) to a PMI (10N) in a slot (4N) through prediction in the manner of example 2-1. The terminal device determines an average PMI of the PMI (6N) to the PMI (10N). The terminal device feeds back the average PMI in a slot (4N+X). After receiving the average PMI, the network device sends downlink data within the window duration D in which the time offset T is used as start time by using a precoder determined based on the average PMI.

Alternatively, the terminal device feeds back any one or more of the PMI (6N) to the PMI (10N) in the slot (4N+X). In FIG. 12, for example, an average PMI is fed back.

In a possible embodiment, the terminal device feeds back, to the network device, channel information obtained through processing of a codebook, where the codebook is a codebook based on a time domain dimension, and the channel information obtained through processing or projection of the codebook represents the one or more pieces of predicted channel information. After receiving the channel information obtained through processing of the codebook, the network device decompresses or performs back projection on the channel information by using the codebook, to obtain the one or more pieces of predicted channel information. In embodiments, the codebook may be a Doppler codebook. Based on this possible embodiment, transmission resources are saved.

Figure 13:
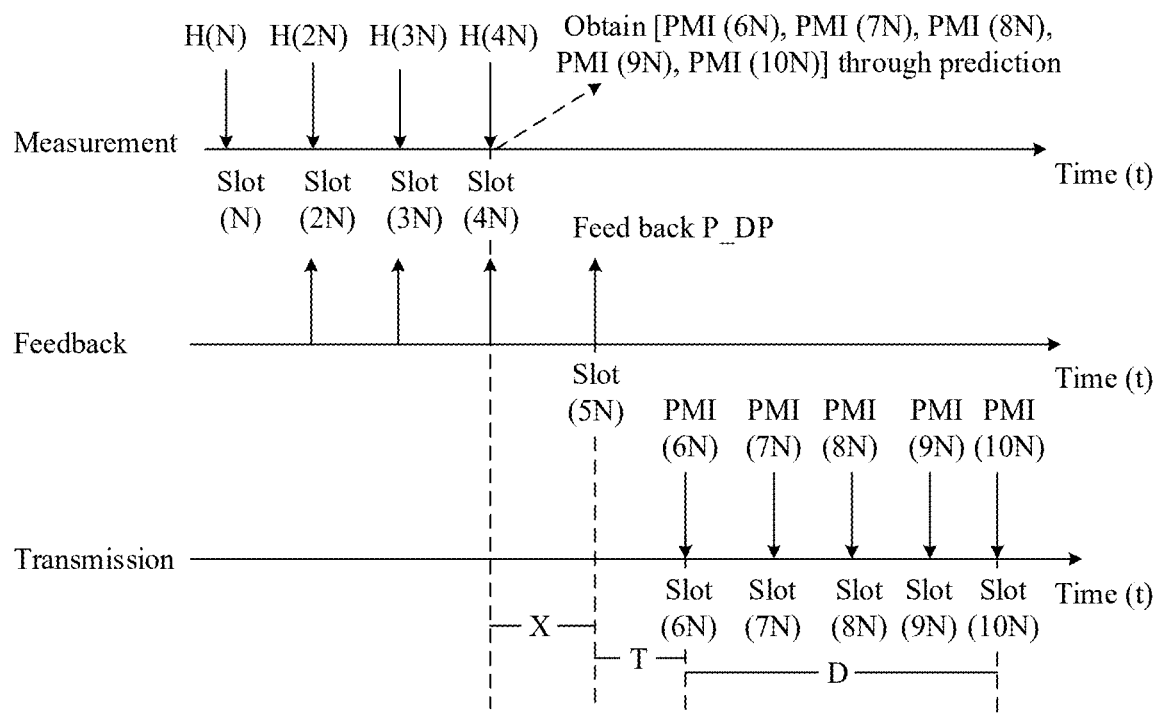
FIG. 13 is a schematic diagram of still another channel information feedback according to an embodiment of this application.

Example 2-5: As shown in FIG. 13, after the terminal device obtains a predicted PMI (6N) to a predicted PMI (10N) in a slot (4N) in the manner of example 2-1, the terminal device compresses the PMI (6N) to the PMI (10N) by using a codebook, to obtain compressed channel information P_DP. The terminal device feeds back P_DP to the network device. After receiving P_DP, the network device decompresses P_DP by using the codebook, to obtain the PMI (6N) to the PMI (10N). After receiving the predicted PMI (6N) to the predicted PMI (10N), the network device sends downlink data in a corresponding slot by using a precoder determined based on a corresponding PMI.

In an embodiment, channels H(6N) to H(10N) or a PMI (6N) to a PMI (10N) at a plurality of moments may be represented by using a Doppler codebook. To be specific, H(6N) to H(10N) or the PMI (6N) to the PMI (10N) are represented as a sum of sum coefficients of $L_1$ space domain vectors, K frequency domain vectors, and N_slot time domain vectors, where $L_1$, K, and N_slot may be configured by a base station. A corresponding Doppler codebook structure is as follows:

$$H^{N_1 \times N_{ab} \times N_{slot}} =$$

$$\sum_{t=0}^{N\_slot-1} \sum_{s=0}^{L_1-1} \sum_{f=0}^{K-1} a_{s,f,t} S^{N_1 \times 1 \times 1} \otimes F^{1 \times N_{sb} \times 1} \otimes R^{1 \times 1 \times N_{slot}},$$

where
$H^{N \times N_{sb} \times N_{slot}}$ may represent a space-frequency-time three-dimensional channel matrix formed by H(6N) to H(10N) or the PMI (6N) to the PMI (10N).

$$\sum_{t=0}^{N\_slot-1} \sum_{s=0}^{L_1-1} \sum_{f=0}^{K-1} a_{s,f,t} S^{N_1 \times 1 \times 1} \otimes F^{1 \times N_{sb} \times 1} \otimes R^{1 \times 1 \times N_{slot}}$$

represents the channel information P_DP obtained after projection of the codebook is performed on H(6N) to H(10N) or the PMI (6N) to the PMI (10N). $a_{s,f,t}$ is a sum coefficient, and is a complex number. S, F, and R are a space domain base vector, a frequency domain base vector, and a time domain base vector respectively, and lengths thereof are represented as $N_1$, $N_{sb}$, and $N_{slot}$ respectively.

An embodiment of the space domain base vector, the frequency domain base vector, and the time domain base vector is an oversampling discrete Fourier transform (Discrete Fourier Transformation, DFT) vector, and an expression is:

$$b = \left[ e^{j\frac{2\pi g}{QG}0} \quad e^{j\frac{2\pi g}{QG}1} \quad \ldots \quad e^{j\frac{2\pi g}{QG}(G-1)} \right],$$

where

Q is an oversampling ratio, G is a length of the vector, and a value range of g is 0 to QG−1. In an embodiment, Q may be equal to 1. In this case, Q represents that no oversampling is performed, that is, corresponds to the DFT vector.

The space domain base vector is special. Usually, an antenna panel is a square array, and antenna array elements or equivalent ports are distributed in two dimensions. Another embodiment of the space domain base vector is a Kronecker product of two space domain component vectors:

$$S = b_H \otimes b_v = \left[ b_v e^{j\frac{2\pi g}{Q_H G_H}0} \quad b_v e^{j\frac{2\pi g}{Q_H G_H}1} \quad \ldots \quad b_v e^{j\frac{2\pi g}{Q_H G_H}(G_H-1)} \right];$$

and $$b_v = \left[ e^{j\frac{2\pi m}{Q_v G_v}0} \quad e^{j\frac{2\pi m}{Q_v G_v}1} \quad \ldots \quad e^{j\frac{2\pi m}{Q_v G_v}(G_v-1)} \right],$$

where

S is the space domain base vector, $b_H$ is a space domain base vector in a horizontal direction, and by is a space domain base vector in a vertical direction. $Q^H$ and $Q_v$ are oversampling ratios, $G^H$ and $G_v$ are vector lengths, a value range of g is 0 to $Q_H G_H$−1, and a value range of m is 0 to $Q_v G_v$−1. In an embodiment, Qv and/or Qv may be 1.

In the foregoing Example 1-1, Example 1-2, and Example 2-1 to Example 2-5, that the predicted channel information is a predicted PMI is used as an example. When the predicted channel information is a predicted channel coefficient, an embodiment principle is the same as that of this example, and details are not described herein again.

Figure 14:
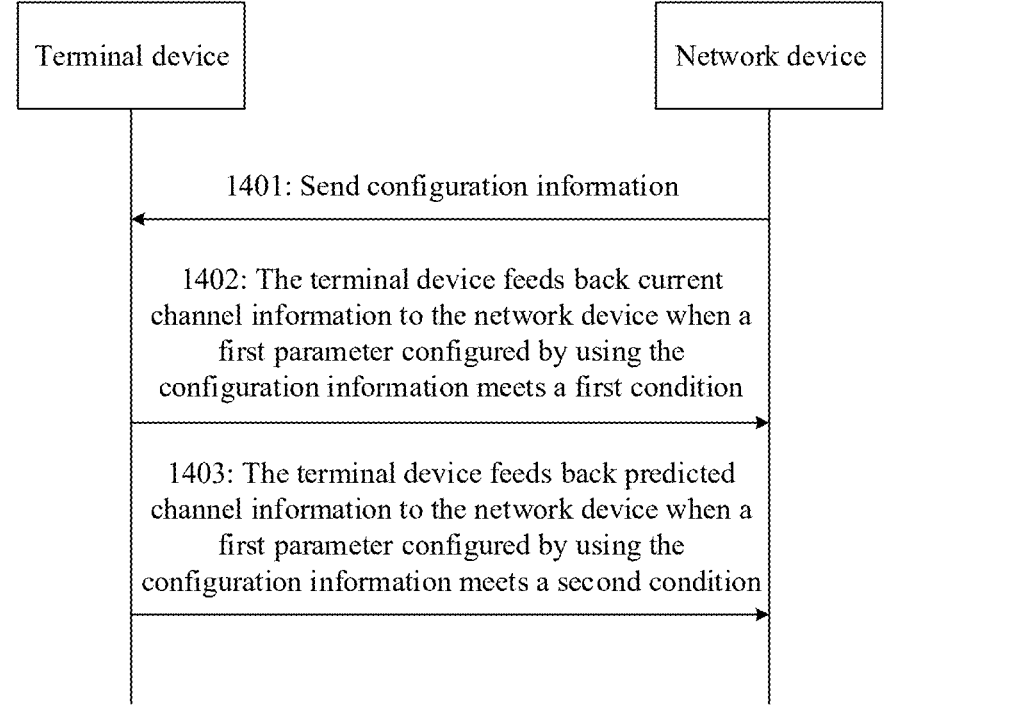
FIG. 14 is a schematic flowchart of another channel information feedback method according to an embodiment of this application.

FIG. 14 is a schematic flowchart of a channel information feedback method according to an embodiment of this application. As shown in FIG. 14, the channel information feedback method includes the following operation 1401 to operation 1403. The method shown in FIG. 14 may be performed by a network device and a terminal device. Alternatively, the method shown in FIG. 14 may be performed by a chip in the network device and a chip in the terminal device. In FIG. 14, an example in which the network device and the terminal device are execution bodies is used for description.

1401: The network device sends configuration information to the terminal device.

The configuration information is used to configure a first parameter. When the first parameter configured by using the configuration information meets a first condition, the first parameter is used to indicate the terminal device to feed back current channel information; or when the first parameter configured by using the configuration information meets a second condition, the first parameter is used to indicate the terminal device to feed back predicted channel information. For descriptions of the first parameter, the first condition, and the second condition, refer to the descriptions in the foregoing method embodiment. Details are not described herein again.

1402: The terminal device feeds back the current channel information to the network device when the first parameter configured by using the configuration information meets the first condition.

1403: The terminal device feeds back the predicted channel information to the network device when the first parameter configured by using the configuration information meets the second condition.

Correspondingly, the network device receives the current channel information fed back by the terminal device when the first parameter configured by using the configuration information meets the first condition. The network device receives the predicted channel information fed back by the terminal device when the first parameter configured by using the configuration information meets the second condition.

For related descriptions of the current channel information and the predicted channel information, and specific embodiments of feeding back the current channel information and the predicted channel information by the terminal device to the network device, refer to the descriptions in the foregoing method embodiment. Details are not described herein again.

Based on the method described in FIG. 14, channel information feedback requirements in different scenarios can be met, feedback overheads can be reduced, and system performance can be improved.

Figure 15:
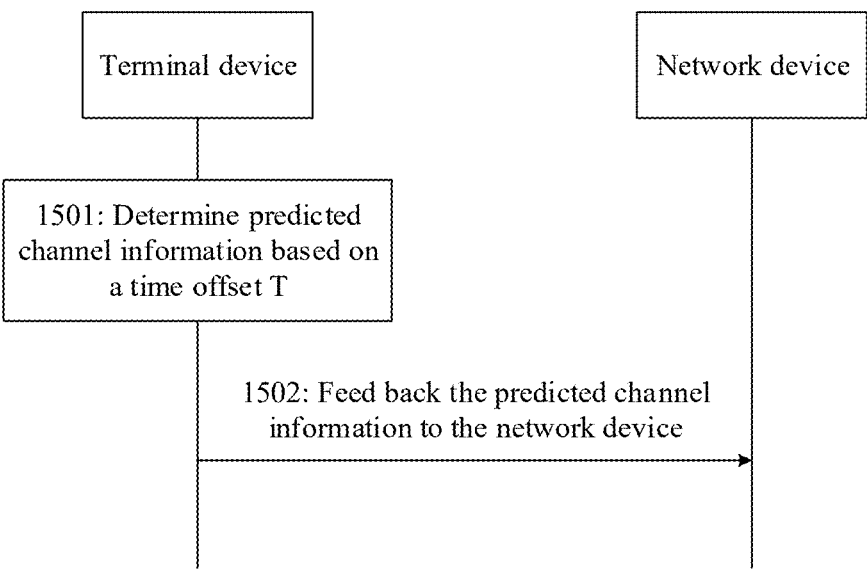
FIG. 15 is a schematic flowchart of still another channel information feedback method according to an embodiment of this application.

FIG. 15 is a schematic flowchart of a channel information feedback method according to an embodiment of this application. As shown in FIG. 15, the channel information feedback method includes the following operation 1501 and operation 1502. The method shown in FIG. 15 may be performed by a terminal device. Alternatively, the method shown in FIG. 15 may be performed by a chip in the terminal device. In FIG. 15, an example in which the terminal device is an execution body is used for description.

1501: The terminal device determines predicted channel information based on a time offset T.

In a possible embodiment, a network device may further send configuration information to the terminal device, where the configuration information is used to configure the time offset T. Correspondingly, the terminal device may further receive the configuration information. Alternatively, the time offset T may be specified in a protocol in advance. For other related descriptions of the time offset T, refer to the descriptions in the foregoing embodiments. Details are not described herein again.

1502: The terminal device feeds back the predicted channel information to the network device.

In this embodiment of this application, after determining the predicted channel information, the terminal device feeds back the predicted channel information to the network device. Correspondingly, the network device may receive the predicted channel information fed back by the terminal device.

For related descriptions of the predicted channel information, refer to corresponding descriptions in the foregoing method embodiments. For specific embodiments of operation 1501 operation step 1502, refer to the descriptions in the first specific embodiment in which the terminal device feeds back the predicted channel information to the network device in the foregoing method embodiments. Details are not described herein again.

Based on the method described in FIG. 15, the terminal device may report the predicted channel information for which the time offset T is compensated, to match a channel during actual transmission. This improves system performance.

Figure 16:
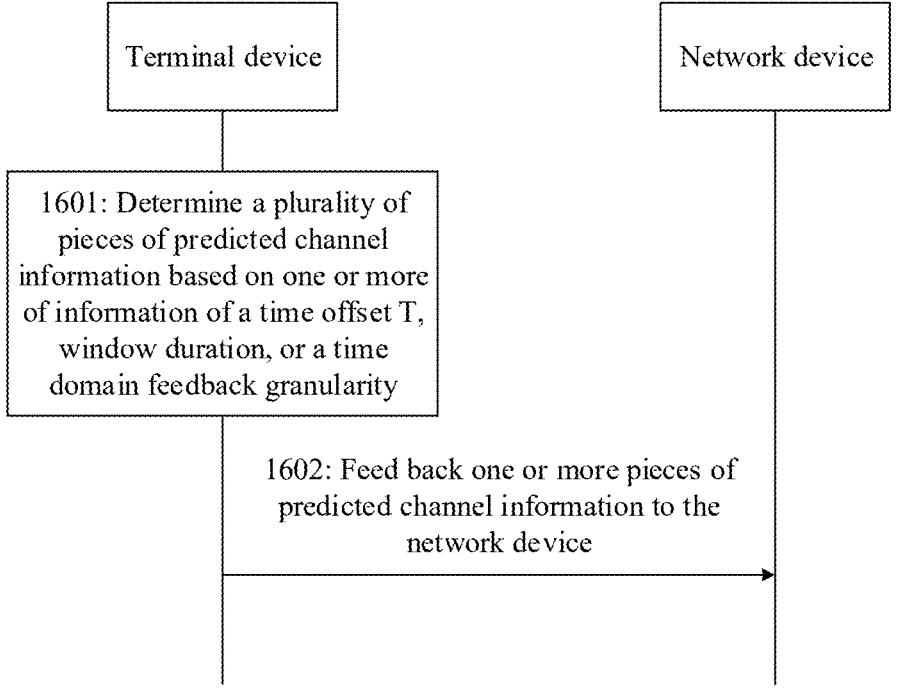
FIG. 16 is a schematic flowchart of still another channel information feedback method according to an embodiment of this application.

FIG. 16 is a schematic flowchart of a channel information feedback method according to an embodiment of this application. As shown in FIG. 16, the channel information feedback method includes the following operation 1601 and operation 1602. The method shown in FIG. 16 may be performed by a terminal device. Alternatively, the method shown in FIG. 16 may be performed by a chip in the terminal device. In FIG. 16, an example in which the terminal device is an execution body is used for description.

1601: The terminal device determines a plurality of pieces of predicted channel information based on one or more of information of a time offset T, window duration, or a time domain feedback granularity.

In a possible embodiment, a network device may further send configuration information to the terminal device, where the configuration information is used to configure one or more of the time offset T, the window duration, or the time domain feedback granularity. Correspondingly, the terminal device may further receive the configuration information. Alternatively, the time offset T, the window duration, or the time domain feedback granularity may be specified in a protocol in advance. For other related descriptions of the time offset T, the window duration, or the time domain feedback granularity, refer to the descriptions in the foregoing embodiments. Details are not described herein again.

1602: The terminal device feeds back one or more pieces of predicted channel information to the network device.

In a possible embodiment, a manner in which the terminal device feeds back the one or more pieces of predicted channel information to the network device is specifically: The terminal device feeds back channel information obtained through processing of a codebook to the network device, where the codebook is a codebook based on a time domain dimension, and the channel information obtained through processing of the codebook represents the one or more pieces of predicted channel information.

For related descriptions of the predicted channel information, refer to corresponding descriptions in the foregoing method embodiments. For specific embodiments of operation 1601 and operation 1602, refer to the descriptions in the second specific embodiment in which the terminal device feeds back the predicted channel information to the network device in the foregoing method embodiments. Details are not described herein again.

Based on the method described in FIG. 16, the terminal device may feed back the one or more pieces of predicted channel information, so that the network device can use the predicted channel information to perform matching on a time-varying channel within the window duration. This further improves system performance.

Figure 17:
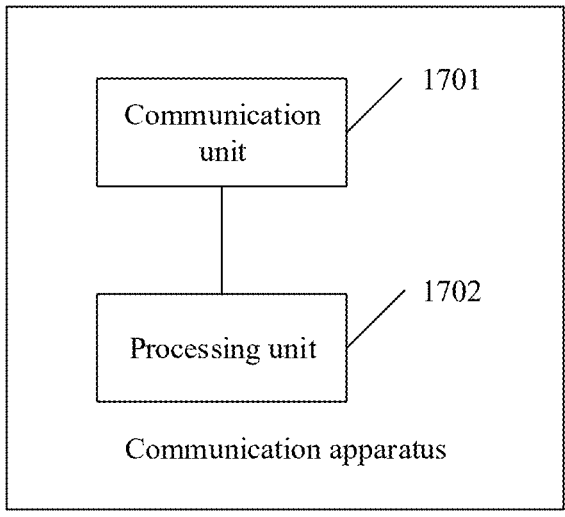
FIG. 17 is a schematic diagram of a structure of a communication apparatus according to an embodiment of this application.

FIG. 17 is a schematic diagram of a structure of a communication apparatus according to an embodiment of this application. The communication apparatus shown in FIG. 17 may be configured to perform some or all functions of the terminal device in the method embodiment described in FIG. 4. The apparatus may be a terminal device, an apparatus in the terminal device, or an apparatus that can be used together with the terminal device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to receive configuration information sent by a network device, where the configuration information is used to configure a feedback mode of channel information; and the communication unit 1701 is further configured to feed back current channel information to the network device when the feedback mode configured by using the configuration information is a first mode; or the communication unit 1701 is further configured to feed back predicted channel information to the network device when the feedback mode configured by using the configuration information is a second mode.

In a possible embodiment, the current channel information is a current precoding matrix indicator (PMI), and the predicted channel information is a predicted channel coefficient.

In a possible embodiment, the configuration information includes a first parameter; and when the first parameter meets a first condition, the configuration information is used to configure the first mode; or when the first parameter meets a second condition, the configuration information is used to configure the second mode, and the first condition is different from the second condition.

In a possible embodiment, when the feedback mode configured by using the configuration information is the second mode, a manner in which the communication unit 1701 feeds back the predicted channel information to the network device is specifically: determining the predicted channel information based on a time offset T when the feedback mode configured by using the configuration information is the second mode; and feeding back the predicted channel information to the network device.

In a possible embodiment, when the feedback mode configured by using the configuration information is the second mode, the configuration information is further used to configure the time offset T.

In a possible embodiment, when the feedback mode configured by using the configuration information is the second mode, a manner in which the communication unit 1701 feeds back the predicted channel information to the network device is specifically: when the feedback mode configured by using the configuration information is the second mode, determining a plurality of pieces of predicted channel information based on one or more of information of a time offset T, window duration, or a time domain feedback granularity, where the window duration is a time interval between moments at which the first piece of channel information and the last piece of channel information are predicted, and the time domain feedback granularity is a time interval between moments at which two adjacent pieces of channel information are fed back; and feeding back one or more pieces of predicted channel information to the network device.

In a possible embodiment, a manner in which the communication unit 1701 feeds back the one or more pieces of predicted channel information to the network device is specifically: feeding back channel information obtained through processing of a codebook to the network device, where the codebook is a codebook based on a time domain dimension, and the channel information obtained through processing of the codebook represents the one or more pieces of predicted channel information.

In a possible embodiment, when the feedback mode configured by using the configuration information is the second mode, the configuration information is further used to configure one or more of the time offset T, the window duration, or the time domain feedback granularity.

FIG. 17 is a schematic diagram of a structure of a communication apparatus according to an embodiment of this application. The communication apparatus shown in FIG. 17 may be configured to perform some or all functions of the network device in the method embodiment described in FIG. 4. The apparatus may be a network device, an apparatus in the network device, or an apparatus that can be used together with the network device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to send configuration information to a terminal device, where the configuration information is used to configure a feedback mode of channel information; and when the feedback mode configured by using the configuration information is a first mode, the feedback mode is used to indicate the terminal device to feed back current channel information; or when the feedback mode configured by using the configuration information is a second mode, the feedback mode is used to indicate the terminal device to feed back predicted channel information.

In a possible embodiment, the communication unit 1701 is configured to receive the current channel information fed back by the terminal device when the feedback mode configured by using the configuration information is the first mode; and is further configured to receive the predicted channel information fed back by the terminal device when the feedback mode configured by using the configuration information is the second mode.

In a possible embodiment, the current channel information is a current precoding matrix indicator PMI, and the predicted channel information is a predicted channel coefficient.

In a possible embodiment, the configuration information includes a first parameter; and when the first parameter meets a first condition, the configuration information is used to configure the first mode; or when the first parameter meets a second condition, the configuration information is used to configure the second mode, and the first condition is different from the second condition.

In a possible embodiment, when the feedback mode configured by using the configuration information is the second mode, the configuration information is further used to configure a time offset T.

In a possible embodiment, when the feedback mode configured by using the configuration information is the second mode, the configuration information is further used to configure one or more of a time offset T, window duration, or a time domain feedback granularity, where the window duration is a time interval between moments at which the first piece of channel information and the last piece of channel information are predicted by the terminal device, and the time domain feedback granularity is a time interval between moments at which two adjacent pieces of channel information are fed back by the terminal device.

In a possible embodiment, a manner in which the communication unit 1701 receives the predicted channel information fed back by the terminal device is specifically: further receiving one or more pieces of predicted channel information fed back by the terminal device.

In a possible embodiment, a manner in which the communication unit 1701 receives the one or more pieces of predicted channel information fed back by the terminal device is specifically: receiving channel information, obtained through processing of a codebook, that is fed back by the terminal device, where the codebook is a codebook based on a time domain dimension, and the channel information obtained through processing of the codebook represents the one or more pieces of predicted channel information.

FIG. 17 is a schematic diagram of a structure of a communication apparatus according to an embodiment of this application. The communication apparatus shown in FIG. 17 may be configured to perform some or all functions of the terminal device in the method embodiment described in FIG. 14. The apparatus may be a terminal device, an apparatus in the terminal device, or an apparatus that can be used together with the terminal device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to receive configuration information sent by a network device, where the configuration information is used to configure a first parameter; and the communication unit 1701 is further configured to feed back current channel information to the network device when the first parameter configured by using the configuration information meets a first condition; or the communication unit 1701 is further configured to feed back predicted channel information to the network device when the first parameter configured by using the configuration information meets a second condition.

In a possible embodiment, the current channel information is a current precoding matrix indicator PMI, and the predicted channel information is a predicted channel coefficient.

In a possible embodiment, when the first parameter configured by using the configuration information meets the second condition, a manner in which the communication unit 1701 feeds back the predicted channel information to the network device is specifically: when the first parameter configured by using the configuration information meets the second condition, determining the predicted channel information based on a time offset T; and feeding back the predicted channel information to the network device.

In a possible embodiment, when the first parameter configured by using the configuration information meets the second condition, the configuration information is further used to configure the time offset T.

In a possible embodiment, when the first parameter configured by using the configuration information meets the second condition, a manner in which the communication unit 1701 feeds back the predicted channel information to the network device is specifically: when the first parameter configured by using the configuration information meets the second condition, determining a plurality of pieces of predicted channel information based on one or more of information of a time offset T, window duration, or a time domain feedback granularity, where the window duration is a time interval between moments at which the first piece of channel information and the last piece of channel information are predicted, and the time domain feedback granularity is a time interval between moments at which two adjacent pieces of channel information are fed back; and feeding back one or more pieces of predicted channel information to the network device.

In a possible embodiment, a manner in which the communication unit 1701 feeds back the one or more pieces of predicted channel information to the network device is specifically: feeding back channel information obtained through processing of a codebook to the network device, where the codebook is a codebook based on a time domain dimension, and the channel information obtained through processing of the codebook represents the one or more pieces of predicted channel information.

In a possible embodiment, when the first parameter configured by using the configuration information meets the second condition, the configuration information is further used to configure one or more of the time offset T, the window duration, or the time domain feedback granularity.

FIG. 17 is a schematic diagram of a structure of a communication apparatus according to an embodiment of this application. The communication apparatus shown in FIG. 17 may be configured to perform some or all functions of the network device in the method embodiment described in FIG. 14. The apparatus may be a network device, an apparatus in the network device, or an apparatus that can be used together with the network device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to send configuration information to a terminal device, where the configuration information is used to configure a first parameter; and when the first parameter configured by using the configuration information meets a first condition, the first parameter is used to indicate the terminal device to feed back current channel information; or when the first parameter configured by using the configuration information meets a second condition, the first parameter is used to indicate the terminal device to feed back predicted channel information.

In a possible embodiment, the communication unit 1701 is configured to receive the current channel information fed back by the terminal device when the first parameter configured by using the configuration information meets the first condition; and is further configured to receive the predicted channel information fed back by the terminal device when the first parameter configured by using the configuration information meets the first condition.

In a possible embodiment, the current channel information is a current precoding matrix indicator (PMI), and the predicted channel information is a predicted channel coefficient.

In a possible embodiment, when the first parameter configured by using the configuration information meets the second condition, the configuration information is further used to configure a time offset T.

In a possible embodiment, when the first parameter configured by using the configuration information meets the second condition, the configuration information is further used to configure one or more of a time offset T, window duration, or a time domain feedback granularity, where the window duration is a time interval between moments at which the first piece of channel information and the last piece of channel information are predicted by the terminal device, and the time domain feedback granularity is a time interval between moments at which two adjacent pieces of channel information are fed back by the terminal device.

In a possible embodiment, a manner in which the communication unit 1701 receives the predicted channel information fed back by the terminal device is specifically: receiving one or more pieces of predicted channel information fed back by the terminal device.

In a possible embodiment, a manner in which the communication unit 1701 receives the one or more pieces of predicted channel information fed back by the terminal device is specifically: receiving channel information, obtained through processing of a codebook, that is fed back by the terminal device, where the codebook is a codebook based on a time domain dimension, and the channel information obtained through processing of the codebook represents the one or more pieces of predicted channel information.

FIG. 17 is a schematic diagram of a structure of a communication apparatus according to an embodiment of this application. The communication apparatus shown in FIG. 17 may be configured to perform some or all functions of the terminal device in the method embodiment described in FIG. 15. The apparatus may be a terminal device, an apparatus in the terminal device, or an apparatus that can be used together with the terminal device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The processing unit 1702 is configured to determine predicted channel information based on a time offset T; and the communication unit 1701 is configured to feed back the predicted channel information to a network device.

In a possible embodiment, the communication unit 1701 is further configured to receive configuration information sent by the network device, where the configuration information is used to configure the time offset T.

In a possible embodiment, the predicted channel information is a predicted PMI or a predicted channel coefficient.

FIG. 17 is a schematic diagram of a structure of a communication apparatus according to an embodiment of this application. The communication apparatus shown in FIG. 17 may be configured to perform some or all functions of the network device in the method embodiment described in FIG. 15. The apparatus may be a network device, an apparatus in the network device, or an apparatus that can be used together with the network device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to receive predicted channel information fed back by a terminal device.

In a possible embodiment, the communication unit 1701 is further configured to send configuration information to the terminal device, where the configuration information is used to configure a time offset T.

In a possible embodiment, the predicted channel information is a predicted PMI or a predicated channel coefficient.

FIG. 17 is a schematic diagram of a structure of a communication apparatus according to an embodiment of this application. The communication apparatus shown in FIG. 17 may be configured to perform some or all functions of the terminal device in the method embodiment described in FIG. 16. The apparatus may be a terminal device, an apparatus in the terminal device, or an apparatus that can be used together with the terminal device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The processing unit 1702 is configured to determine a plurality of pieces of predicted channel information based on one or more pieces of information of a time offset T, window duration, or a time domain feedback granularity; and the communication unit 1701 is configured to feed back one or more pieces of predicted channel information to a network device.

In a possible embodiment, the communication unit 1701 is further configured to receive configuration information sent by the network device, where the configuration information is used to configure one or more of the time offset T, the window duration, or the time domain feedback granularity.

In a possible embodiment, a manner in which the communication unit 1701 feeds back the one or more pieces of predicted channel information to the network device is specifically: feeding back channel information obtained through processing of a codebook to the network device, where the codebook is a codebook based on a time domain dimension, and the channel information obtained through processing of the codebook represents the one or more pieces of predicted channel information.

In a possible embodiment, the predicted channel information is a predicted PMI or a predicted channel coefficient.

FIG. 17 is a schematic diagram of a structure of a communication apparatus according to an embodiment of this application. The communication apparatus shown in FIG. 17 may be configured to perform some or all functions of the network device in the method embodiment described in FIG. 16. The apparatus may be a network device, an apparatus in the network device, or an apparatus that can be used together with the network device. The communication apparatus may alternatively be a chip system. The communication apparatus shown in FIG. 17 may include a communication unit 1701 and a processing unit 1702. The communication unit may alternatively be referred to as a transceiver unit, or the communication unit includes a receiving unit and a sending unit. The processing unit 1702 is configured to process data.

The communication unit 1701 is configured to receive one or more pieces of predicted channel information fed back by a terminal device.

In a possible embodiment, the communication unit 1701 is further configured to send configuration information to the terminal device, where the configuration information is used to configure one or more of a time offset T, window duration, or a time domain feedback granularity.

In a possible embodiment, a manner in which the communication unit 1701 receives the one or more pieces of predicted channel information fed back by the terminal device is specifically: receiving channel information, obtained through processing of a codebook, that is fed back by the terminal device, where the codebook is a codebook based on a time domain dimension, and the channel information obtained through processing of the codebook represents the one or more pieces of predicted channel information.

In a possible embodiment, the predicted channel information is a predicted PMI or a predicted channel coefficient.

Figure 18A:
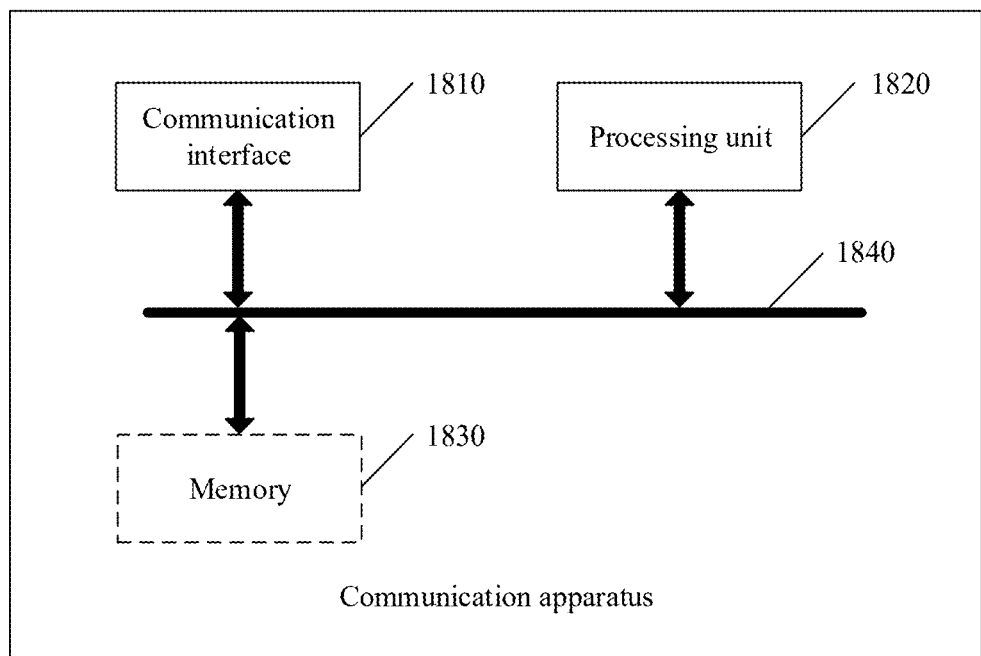
FIG. 18*a* is a schematic diagram of a structure of another communication apparatus according to an embodiment of this application.

FIG. 18a shows a communication apparatus 180 according to an embodiment of this application. The communication apparatus 180 is configured to implement functions of the terminal device in the foregoing method embodiments. The apparatus may be a terminal device or an apparatus used in the terminal device. The apparatus used in the terminal device may be a chip system or a chip in the terminal device. The chip system may include a chip, or may include a chip and another discrete component. Alternatively, the communication apparatus 180 is configured to implement functions of the network device in the foregoing method embodiments. The apparatus may be a network device or an apparatus used in the network device. The apparatus used in the network device may be a chip system or a chip in the network device. The chip system may include a chip, or may include a chip and another discrete component.

The communication apparatus 180 includes at least one processor 1820, configured to implement a data processing function of the terminal device or the network device in the method embodiments of this application. For example, when the apparatus 180 is a terminal device or an apparatus used in the terminal device, the processor 1820 is configured to perform a processing operation of the terminal device in the embodiment corresponding to FIG. 4, or is configured to perform a processing operation of the terminal device in the embodiment corresponding to FIG. 14, or is configured to perform operation 1501 in FIG. 15, or is configured to perform operation 1601 in FIG. 16. For another example, when the apparatus 180 is a network device or an apparatus used in the network device, the processor 1820 is configured to perform a processing operation of the network device in the embodiment corresponding to FIG. 4, FIG. 14, FIG. 15, or FIG. 16.

The apparatus 180 may further include a communication interface 1810, configured to implement receiving and sending operations of the terminal device or the network device in the method embodiments of this application. For example, when the apparatus 180 is a terminal device or an apparatus used in the terminal device, the communication interface 1810 is configured to perform the operation of receiving configuration information in FIG. 4, and operation 402 and operation 403, or is configured to perform the operation of receiving configuration information in FIG. 14, and operation 1402 and operation 1403, or is configured to perform operation 1502 in FIG. 15, or is configured to perform operation 1602 in FIG. 16. For another example, when the apparatus 180 is a network device or an apparatus used in the network device, the communication interface 1810 is configured to: perform operation 401 in FIG. 4, and receive current channel information or predicted channel information. Alternatively, the communication interface 1810 is configured to: perform operation 1401 in FIG. 14, and receive current channel information or predicted channel information. Alternatively, the communication interface 1810 is configured to perform the operation of receiving predicted channel information in FIG. 15. Alternatively, the communication interface 1810 is configured to perform the operation of receiving one or more pieces of predicted channel information in FIG. 16.

In embodiments of this application, the communication interface may be a transceiver, a circuit, a bus, a module, or a communication interface of another type, and is configured to communicate with another device through a transmission medium. For example, the communication interface 1810 is used by an apparatus in the apparatus 180 to communicate with another device. The processor 1820 receives and sends data through the communication interface 1810, and is configured to implement the method in the foregoing method embodiments.

The apparatus 180 may further include at least one memory 1830, configured to store program instructions and/or data. The memory 1830 is coupled to the processor 1820. The coupling in this embodiment of this application may be an indirect coupling or a communication connection between apparatuses, units, or modules in an electrical form, a mechanical form, or another form, and is used for information exchange between the apparatuses, the units, or the modules. The processor 1820 may cooperate with the memory 1830. The processor 1820 may execute the program instructions stored in the memory 1830. At least one of the at least one memory may be included in the processor.

In this embodiment of this application, a specific connection medium between the communication interface 1810, the processor 1820, and the memory 1830 is not limited. In this embodiment of this application, the memory 1830, the communication interface 1820, and the communication interface 1810 are connected through a bus 1840 in FIG. 18a. The bus is represented by using a bold line in FIG. 18a. A manner of connection between other components is merely an example for description, and is not limited thereto. The bus may be classified into an address bus, a data bus, a control bus, and the like. For ease of representation, only one bold line is used to represent the bus in FIG. 18a, but this does not mean that there is only one bus or only one type of bus.

When the apparatus 180 is specifically an apparatus used in the terminal device or the network device, for example, when the apparatus 180 is specifically a chip or a chip system, the communication interface 1810 may output or receive a baseband signal. When the apparatus 180 is specifically a terminal device or a network device, the communication interface 1810 may output or receive a radio frequency signal. In embodiments of this application, the processor may be a general-purpose processor, a digital signal processor, an application-specific integrated circuit, a field-programmable gate array or another programmable logic device, a discrete gate or a transistor logic device, or a discrete hardware component, and may implement or perform the methods, operations, and logical block diagrams disclosed in embodiments of this application. The general-purpose processor may be a microprocessor, any conventional processor, or the like. The operations of the method disclosed with reference to embodiments of this application may be directly performed by a hardware processor, or may be performed by using a combination of hardware in the processor and a software module.

Figure 18B:
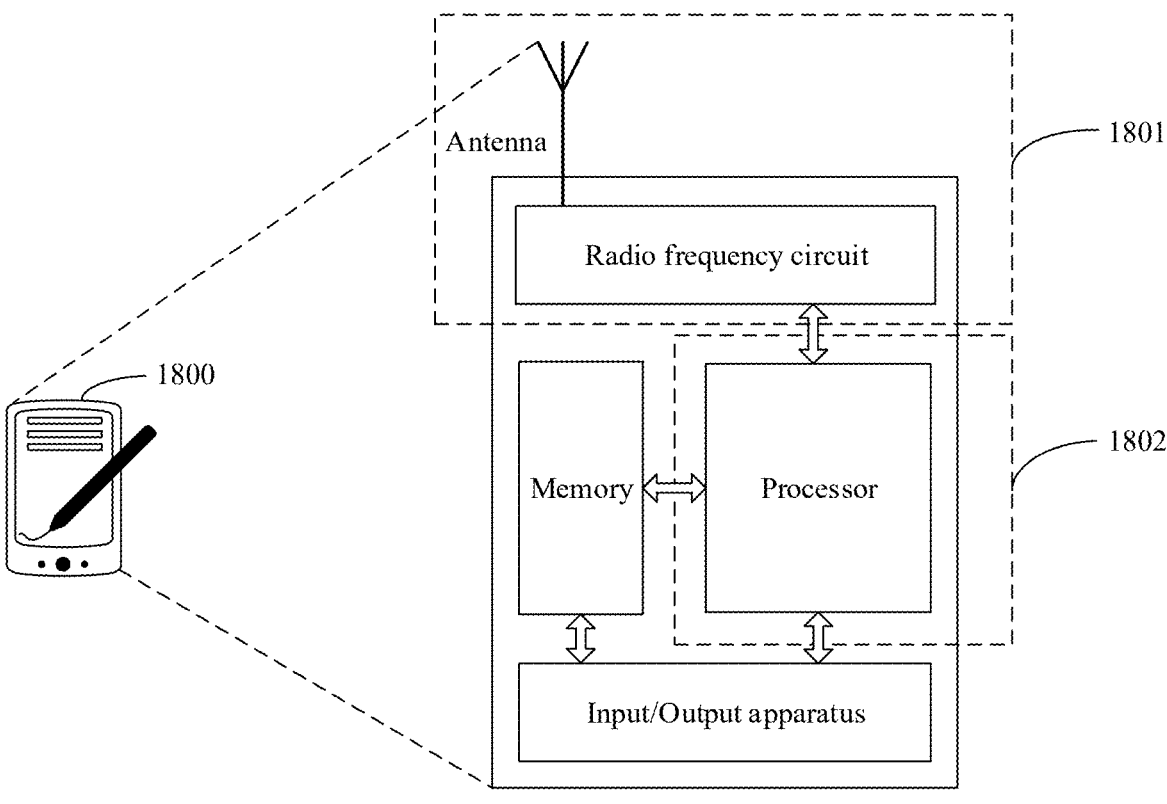
FIG. 18*b* is a schematic diagram of a structure of still another communication apparatus according to an embodiment of this application.

For example, FIG. 18b is a schematic diagram of a structure of another terminal device 1800 according to an embodiment of this application. The terminal device may perform the operations performed by the terminal device in the foregoing method embodiments.

For ease of description, FIG. 18b shows only main components of the terminal device. As shown in FIG. 18b, the terminal device 1800 includes a processor, a memory, a radio frequency circuit, an antenna, and an input/output apparatus. The processor is mainly configured to: process a communication protocol and communication data, control the entire terminal device, execute a software program, and process data of the software program, for example, configured to support the terminal device to perform the procedure described in FIG. 4, FIG. 14, FIG. 15, or FIG. 16. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The terminal device 1800 may further include an input/output apparatus, for example, a touchscreen, a display screen, or a keyboard. The input/output apparatus is mainly configured to: receive data entered by a user, and output data to the user. It should be noted that some types of terminal devices may have no input/output apparatus.

After the terminal device is powered on, the processor may read a software program in a storage unit, explain and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in a form of an electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

Persons skilled in the art may understand that for ease of description, FIG. 18b shows only one memory and only one processor. In an actual terminal device, there may be a plurality of processors and memories. The memory may also be referred to as a storage medium, a storage device, or the like. This is not limited in embodiments of this application.

In an optional embodiment, the processor may include a baseband processor and a central processing unit (central processing unit, CPU). The baseband processor is mainly configured to process a communication protocol and communication data. The CPU is mainly configured to: control the entire terminal device, execute a software program, and process data of the software program. In embodiments, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory may include a volatile memory (volatile memory), for example, a random access memory (random-access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories.

For example, in this embodiment of this application, as shown in FIG. 18b, the antenna and the radio frequency circuit that have receiving and sending functions may be considered as a communication unit 1801 of the terminal device 1800, and the processor that has a processing function may be considered as a processing unit 1802 of the terminal device 1800.

The communication unit 1801 may also be referred to as a transceiver, a transceiver machine, a transceiver apparatus, a transceiver unit, or the like, and is configured to implement the receiving and sending functions. In embodiments, a component that is in the communication unit 1801 and that is configured to implement the receiving function may be considered as a receiving unit, and a component that is in the communication unit 1801 and that is configured to implement the sending function may be considered as a sending unit. In other words, the communication unit 1801 includes the receiving unit and the sending unit. For example, the receiving unit may also be referred to as a receiver machine, a receiver, a receiver circuit, or the like, and the sending unit may be referred to as a transmitter machine, a transmitter, a transmit circuit, or the like.

In some embodiments, the communication unit 1801 and the processing unit 1802 may be integrated into one component, or may be separated as different components. In addition, the processor and the memory may be integrated into one component, or may be separated as different components.

The communication unit 1801 may be configured to perform receiving and sending operations of the terminal device in the foregoing method embodiments. The processing unit 1802 may be configured to perform a data processing operation of the terminal device in the foregoing method embodiments.

An embodiment of this application further provides a computer-readable storage medium. The computer-readable storage medium stores instructions. When run on a processor, the instructions are used to perform the method performed by the terminal device in the foregoing method embodiments.

An embodiment of this application further provides a computer-readable storage medium. The computer-readable storage medium stores instructions. When run on a processor, the instructions are used to perform the method performed by the network device in the foregoing method embodiments.

An embodiment of this application further provides a computer program product. When the computer program product runs on a processor, the computer program product is used to perform the method performed by the terminal device in the foregoing method embodiments.

An embodiment of this application further provides a computer program product. When the computer program product runs on a processor, the computer program product is used to perform the method performed by the network device in the foregoing method embodiments.

An embodiment of this application further provides a communication system. The communication system includes a terminal device and a network device. The terminal device is configured to perform the method performed by the terminal device in the foregoing method embodiments. The network device is configured to perform the method performed by the network device in the foregoing method embodiments.

Based on a same inventive concept, a problem-resolving principle of each device provided in embodiments of this application is similar to that of the method embodiments of this application. Therefore, for embodiments of implementation of the device, refer to the embodiments of the method discussed herein. For brevity, details are not described herein again.

It should be noted that, for brief description, the foregoing method embodiments are represented as a series of actions. However, persons skilled in the art should appreciate that this application is not limited to the described order of the actions, because according to this application, some operations may be performed in other orders or simultaneously. It should be further appreciated by persons skilled in the art that embodiments described in this specification all belong to example embodiments, and the involved actions and modules are not necessarily required by this application.

Cross reference may be made to descriptions of embodiments provided in this application, and the descriptions of embodiments have different focuses. For a part not described in detail in an embodiment, refer to related descriptions of another embodiment. For ease of description and brevity, for example, for functions and performed operations of the apparatuses and devices provided in embodiments of this application, refer to related descriptions of the method embodiments of this application. The method embodiments and the apparatus embodiments may also be mutually referenced, combined, or cited.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

The invention claimed is:

1. A channel information feedback method, comprising:
transmitting, by a communication apparatus, first configuration information, wherein the first configuration information is used to configure a first feedback mode indicating that first to-be-fed-back information is a predicted PMI; and
receiving, by the communication apparatus, the predicted PMI, wherein the predicted PMI is related to a time offset T, window duration, and a time domain feedback granularity, wherein the time offset T is a period of time starting from a slot for channel information feedback, the time domain feedback granularity is N slots, and the window duration is Q*N slots, the Q*N slots are associated with predicted channel matrices used for determining the predicted PMI, wherein N and Q are integers.

2. The method according to claim 1, wherein the method further comprises:
transmitting, by the communication apparatus, second configuration information, wherein the second configuration information is used to configure a second feedback mode indicating that second to-be-fed-back information is a current PMI.

3. The method according to claim 1, wherein the first configuration information is further used to configure the time offset T.

4. The method according to claim 1, wherein the receiving, by the communication apparatus, the predicted PMI comprises:
receiving, by the communication apparatus, PMI obtained through processing of a codebook that is based on a time domain dimension, and the PMI obtained through processing of the codebook represents predicted channel information.

5. A communication apparatus, comprising:
at least one processor; and
one or more memories coupled to the at least one processor and storing programming instructions for execution by the at least one processor causing the communication apparatus to perform operations comprising:

transmitting first configuration information, wherein the first configuration information is used to configure a first feedback mode indicating that first to-be-fed-back information is a predicted PMI, and receiving the predicted PMI, wherein the predicted PMI is related to a time offset T, window duration, and a time domain feedback granularity, wherein the time offset T is a period of time starting from a slot for channel information feedback, the time domain feedback granularity is N slots, and the window duration is Q*N slots, the Q*N slots are associated with predicted channel matrices used for determining the predicted PMI, wherein N and Q are integers.

6. The communication apparatus according to claim 5, wherein the communications apparatus is further caused to perform operations, comprising:

transmitting second configuration information, wherein the second configuration information is used to configure a second feedback mode indicating that second to-be-fed-back information is a current PMI.

7. The communication apparatus according to claim 5, wherein the first configuration information is further used to configure the time offset T.

8. The communication apparatus according to claim 5, wherein the operation for receiving the predicted PMI comprises operation for:

receiving PMI obtained through processing of a codebook that is based on a time domain dimension, and the PMI obtained through processing of the codebook represents predicted channel information.

9. A non-transitory computer-readable storage medium, wherein the computer-readable storage medium stores a program or instructions for being executed by at least one processor of a communications apparatus, and causes the communications apparatus to perform operations comprising:

transmitting first configuration information, wherein the first configuration information is used to configure a first feedback mode indicating that first to-be-fed-back information is a predicted PMI; and receiving the predicted PMI, wherein the predicted PMI is related to a time offset T, window duration, and a time domain feedback granularity, wherein the time offset T is a period of time starting from a slot for channel information feedback, the time domain feedback granularity is N slots, and the window duration is Q*N slots, the Q*N slots are associated with predicted channel matrices used for determining the predicted PMI, wherein N and Q are integers.

10. The non-transitory computer-readable storage medium according to claim 9, wherein the communications apparatus is further caused to perform operations, comprising:

transmitting second configuration information, wherein the second configuration information is used to configure a second feedback mode indicating that second to-be-fed-back information is a current PMI.

11. The non-transitory computer-readable storage medium according to claim 9, wherein the first configuration information is further used to configure the time offset T.

12. The non-transitory computer-readable storage medium according to claim 9, wherein the communications apparatus caused to perform the operation for receiving the predicted PMI comprises the communications apparatus further caused to perform operations for:

receiving PMI obtained through processing of a codebook that is based on a time domain dimension, and the PMI obtained through processing of the codebook represents predicted channel information.

* * * * *